United States Patent
Shiell et al.

[11] Patent Number: 5,950,012
[45] Date of Patent: Sep. 7, 1999

[54] SINGLE CHIP MICROPROCESSOR CIRCUITS, SYSTEMS, AND METHODS FOR SELF-LOADING PATCH MICRO-OPERATION CODES AND PATCH MICROINSTRUCTION CODES

[75] Inventors: Jonathan H. Shiell, Plano; Ian Chen, Houston, both of Tex.

[73] Assignee: Texas Instruments Incorporated, Dallas, Tex.

[21] Appl. No.: 08/813,770

[22] Filed: Mar. 7, 1997

Related U.S. Application Data

[60] Provisional application No. 60/013,043, Mar. 8, 1996.

[51] Int. Cl.⁶ .............................. G06F 9/445; G06F 9/30
[52] U.S. Cl. .......................................... 395/712; 395/385
[58] Field of Search .................................. 395/712, 384, 395/385

[56] References Cited

U.S. PATENT DOCUMENTS

| | | | |
|---|---|---|---|
| 3,748,653 | 7/1973 | Debruyne et al. | 365/200 |
| 4,542,453 | 9/1985 | Patrick et al. | 395/182.06 |
| 4,982,360 | 1/1991 | Johnson et al. | 711/108 |
| 5,432,929 | 7/1995 | Escola et al. | 707/9 |
| 5,481,713 | 1/1996 | Wetmore et al. | 395/705 |
| 5,537,598 | 7/1996 | Kukula et al. | 395/712 |
| 5,748,981 | 5/1998 | Patchen et al. | 395/828 |
| 5,796,974 | 8/1998 | Goddard et al. | 395/387 |

FOREIGN PATENT DOCUMENTS

WO 96/38790  12/1996  WIPO.

OTHER PUBLICATIONS

On-Site ROS Patch Mechanism, IBM Technical Disclosure Bulletin, vol. 30, No. 5, pp. 158–160, Oct. 1987.
Method of Customizing Patches for Each Hardware Configuration, IBM Technical Disclosure Bulletin, vol. 27, No. 4A, pp. 2187–2188, Sep. 1984.

*Primary Examiner*—Tariq R. Hafiz
*Assistant Examiner*—Brian Sattizahn
*Attorney, Agent, or Firm*—Robert D. Marshall, Jr.; Gerald E. Laws; Richard L. Donaldson

[57] ABSTRACT

In a method embodiment (34), the method operates a computer system (10) having a type of configuration and including a single integrated circuit microprocessor (24). The microprocessor operates in response to codes and has an instruction set. The method involves various steps, including determining (40) the type of the configuration. In response to the type of the configuration, the method selects (42) a set of patch codes from a plurality of sets of patch codes. The method also issues (54) a patch request instruction from the instruction set, and it stores (56) the selected set of patch codes to a memory space accessible by the microprocessor. Other circuits, systems, and methods are also disclosed and claimed

67 Claims, 7 Drawing Sheets

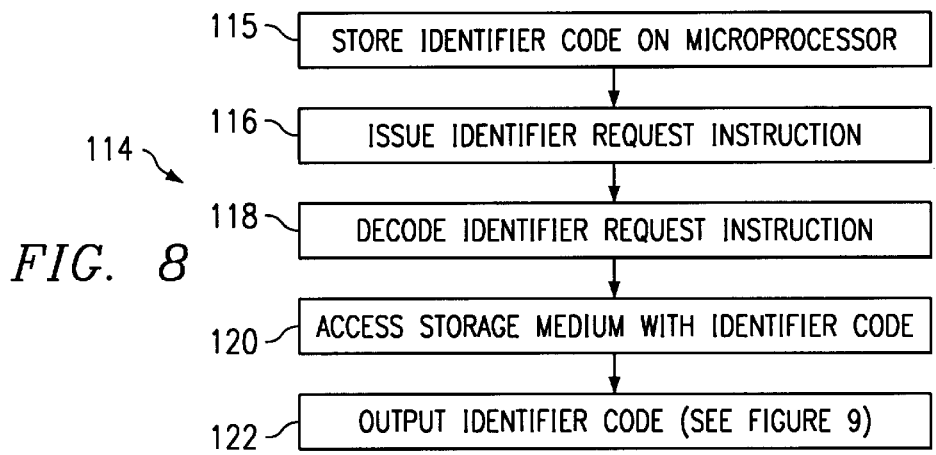
FIG. 8
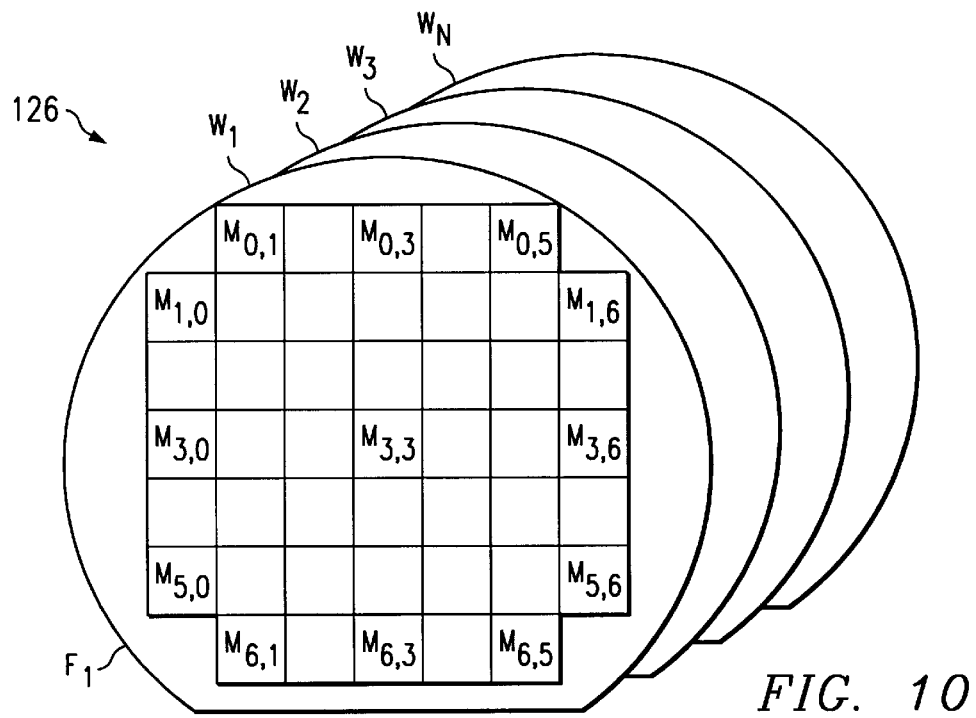
FIG. 9
FIG. 10

SINGLE CHIP MICROPROCESSOR CIRCUITS, SYSTEMS, AND METHODS FOR SELF-LOADING PATCH MICRO-OPERATION CODES AND PATCH MICROINSTRUCTION CODES

This application claims priority under 35 USC 119(e)(1) of the provisional application No. 60/013,043, filed Mar. 8, 1996.

TECHNICAL FIELD OF THE INVENTION

This present embodiments relate to computer systems and microprocessor technology, and are more particularly directed to microprocessor circuits, systems, and methods for self-loading patch micro-operation codes and patch microinstructions codes.

BACKGROUND OF THE INVENTION

The embodiments described below involve the developing and ever-expanding field of computer systems and microprocessors. As these fields advance, considerations of efficiencies bear on all aspects of operation and design. One key example is efficiency of re-designing or producing revisions of microprocessors after the initial version(s) has been fabricated on a wide scale. Particularly, once a microprocessor is designed, manufactured, and widely disseminated, it is not uncommon for the designer and/or manufacturer to determine that errors occurred in the already-distributed product. Indeed, as microprocessor complexity increases, while the time from design to production decreases, there is an increasingly greater chance of such post-production discovery. In the area of microprocessors, the error may be corrected by constructing a newer part, such as a new "revision" as that term is often used in the industry. However, this approach has many drawbacks. For example the error(s) to be corrected may require an immediate or nearimmediate correction, while significant time may be needed to design and manufacture the revision to correct the part. As another example, different errors may be discovered at different times and, if a first revision corrects one error, it may be necessary to revise the part one or more additional times as additional errors are subsequently discovered. Still other problems in the prior art approaches are known in the art.

The techniques used to correct post-manufacture errors often depend on the particular type of error. The inventive embodiments described below are particularly beneficial when used to correct at least two types of these errors, namely, correction of micro-operation codes and correction of microinstruction codes. Both of these types of codes include bit values which control operation of numerous aspects of a microprocessor. Thus, it is clear that the bit values for both the micro-operation codes and the microinstructions are critical to ensure proper operation of the microprocessor. Thus, once a microprocessor is manufactured and distributed, a discovery of one more erroneous values for either or both of the micro-operation codes and the microinstructions must be addressed. In this regard, some prior art systems include architectures which permit correction by replacement, or so-called "patching", of the micro-operation codes and microinstruction codes. Patching operates so that the system, in whatever manner, substitutes a new bit pattern (i.e., either a new micro-operation code or a new microinstruction code) in place of the erroneous one, thereby correcting system operation. However, each of these prior art systems has drawbacks, some of which are discussed below.

Patching has been implemented by IBM systems using various methods. In a first technique, IBM uses a so-called console to write patch microinstruction codes to a content addressable memory ("CAM"). The CAM is a dedicated memory included in the system in addition to the microROM which stores the original microinstruction codes. Thereafter, when a microaddress is issued to the microROM, it also is coupled to the CAM. If the microaddress corresponds to a microinstruction code which should be patched, the CAM outputs the patch microinstruction code. Thereafter, this patch microinstruction code is used by the microprocessor in lieu of the original microinstruction code output by the microROM. One key drawback in this IBM system is that the loading of the patch microinstruction codes to the CAM is under control of the console. The console is a separate processor-based system. Indeed, typically the console is an entirely separate computer system, thereby including a separate motherboard, as well as its own supporting peripherals (e.g., monitor, storage, power, and so forth). Naturally, therefore, this approach has various drawbacks. For example, the requirement of a console may vastly increase the costs of the system. As another example, the system necessarily must have at least two separate processors (i.e., the one being patched, and the one included in the console). In a second technique, the IBM architecture uses its console to write patch information to a fixed portion of memory referred to as the hardware storage area or "HSA." Again, this approach suffers from the requirement of a separate and independent console system. In addition, not all modern day computer systems permit an area of memory to be protected as in the manner of the HSA. However, such a system typically requires active involvement of the low level kernels/operating system that may not exist to rely upon in a general microprocessor market.

From the above, therefore, there arises a need to address the drawbacks of current computer systems in the context of patch micro-operation codes and microinstruction codes, and particularly as directed to systems with a single microprocessor.

SUMMARY OF THE INVENTION

The preferred embodiments relate to computer systems and microprocessor technology, and are more particularly directed to microprocessor circuits, systems, and methods for self-loading patch codes. In a method embodiment, the method operates a computer system having a type of configuration and comprising a single chip microprocessor. The microprocessor operates in response to codes and has an instruction set. The method involves various steps, including determining the type of the configuration. In response to the type of the configuration, the method selects a set of patch codes from a plurality of sets of patch codes. The method also issues a patch request instruction from the instruction set, and it stores the selected set of patch codes to a memory space accessible by the microprocessor. Other circuits, systems, and methods are also disclosed and claimed.

BRIEF DESCRIPTION OF THE DRAWINGS

FIG. 8 illustrates a flowchart of a method embodiment which may be used with a microprocessor to uniquely identify the microprocessor using an instruction from the microprocessor instruction set;

FIG. 9 illustrates the preferred information included within the unique identifier code of the microprocessor;

FIG. 10 diagrammatically illustrates a lot of semiconductor wafers, with one of those wafers further demonstrating the formation and location of microprocessors along the wafer.

DETAILED DESCRIPTION OF THE PREFERRED EMBODIMENTS

Given the Background set forth above, the following Detailed Description sets forth various embodiments. For purposes of assisting the reader, but without any limitation to the inventive scope of those embodiments and the many features of such embodiments, the following Table Of Contents sets forth four subheadings to identify particular topics within the Detailed Description.

Table Of Contents

| Subheading Title | Section |
| --- | --- |
| Self-Loading Patch Micro-operation codes And Patch Microinstruction Codes | 1 |
| Operating With Patch Micro-operation Codes And Patch Microinstruction Codes Stored in Multi-purpose Memory Structure | 2 |
| Unique Identification At The Instruction Set Level | 3 |
| Overall Microprocessor Architecture | 4 |

1. Self-Loading Patch Micro-Operation Codes and Patch Microinstruction Codes Given the considerations set forth in the above Background, the inventors of the present embodiments recognize various limitations of the above. Indeed, the limitations set forth above are particularly compelling in the area of single microprocessor systems. As is known, such systems have become overwhelmingly popular in the last decade or so and will likely continue as such for the foreseeable future. As a result, the embodiments described below have particular benefit as applied to such systems, including the ability to provide support to such systems after they have been manufactured and distributed.

Figure 1:
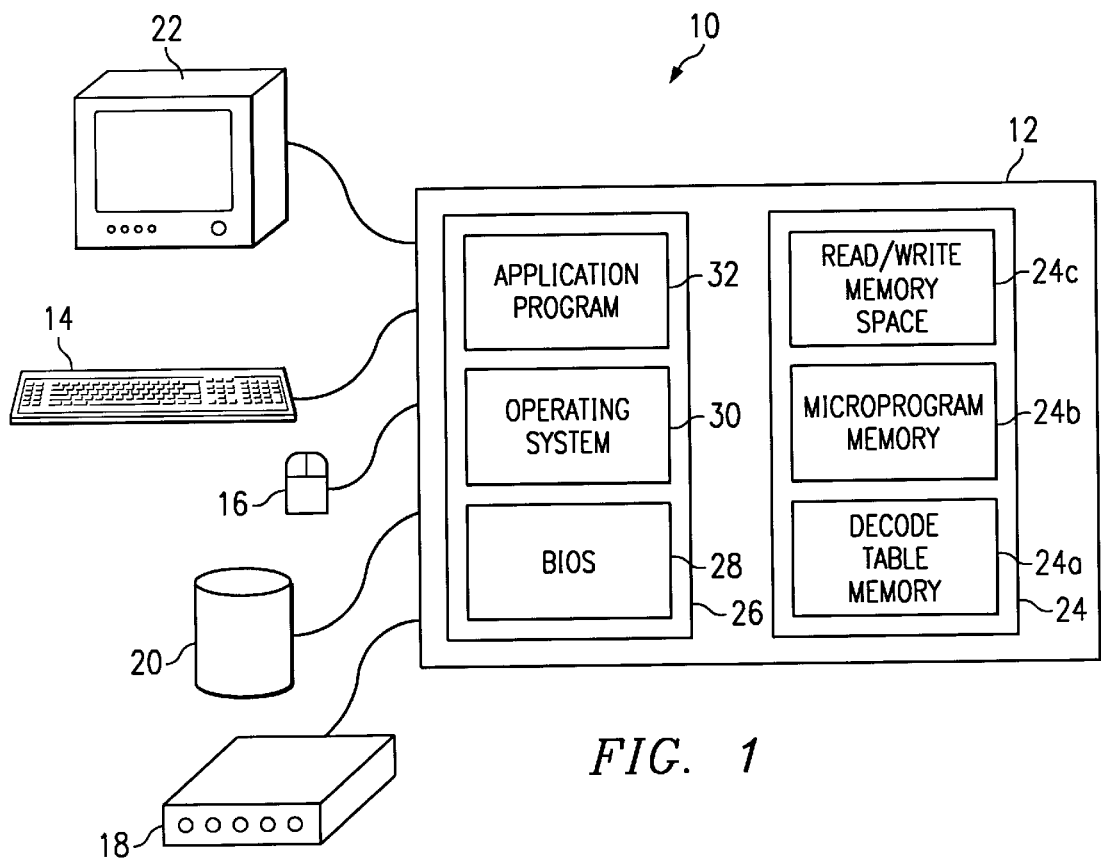
FIG. 1 illustrates a simplified computer system for operating in accordance with various inventive embodiments.

FIG. 1 illustrates a diagrammatic depiction of a computer system designated generally at 10, and of the type in which the present embodiments may be utilized. System 10 includes a computer 12, which includes various blocks described below. Note also that numerous other blocks and interconnections could be included within computer 12, but for purposes of this embodiment they are not shown to simplify the discussion. Continuing, therefore, computer 12 receives user input from various sources, such as a keyboard 14 and a mouse 16 or other pointing device. In addition, computer 12 may receive information from, or output information through, a modem 18. Modem 18 is shown as an external device for purposes of illustration but, of course, could be internal to the computer as known in the art. Computer 12 also bi-directionally communicates with a storage device 20, which may be either internal or external storage and actually may represent several different types of storage devices, including one or more of a floppy disk drive, a hard disk drive, an optical read/write device, and other such devices. Clearly, other input devices and sources are known in the art for communicating user data to computer 12. Lastly, computer 12 outputs information to a display 22 to communicate that information to the user and, while not shown, the information could be further output to a printer or alternative mechanism for providing meaningful information to the user.

Within computer 12, there is shown a single chip microprocessor 24. Microprocessor 24 may be of various different types which contemplate the features described below, and clearly includes various other components and interconnections; however, such aspects need not be detailed at this point but many of them are shown in greater detail below in connection with FIG. 4. At this point, however, note that microprocessor 24 responds to various levels of software control designated generally at 26, and preferably includes three on-chip memories: (1) a decode table memory 24a; (2) a microprogram memory 24b; and (3) a read/write memory space 24c. Each of these aspects is described below.

Software control 26 is depicted by three blocks evenly numbered 28 through 32, thereby demonstrating the hierarchy of operation. At the lowest level is the computer basic input/output system ("BIOS") 28, followed by the operating system 30, and the application program or programs 32. The typical hierarchy of these blocks is well known and, generally, operates such that BIOS 28 controls computer 12 at start-up, which is then followed by operating system 30. Operating system 30 then communicates with one or more application programs 32 for higher level and particularized operations.

Decode table memory 24a stores the micro-operation codes for microprocessor 24. Particularly, and as known in the microprocessor art, each microprocessor is responsive to an instruction set, that is, a level of instructions to which programs are compiled so as to govern the operation of the microprocessor. During operation, many CISC and RISC microprocessors further decode each instruction of the instruction set into what is referred to herein as micro-operation codes. Typically, therefore, the microprocessor includes some type of table, such as decode table memory 24a, which stores the bit values for the micro-operation code(s) corresponding to a given instruction. Note also that these micro-operation codes have different names depending on the architecture and/or manufacturer. For example, in the Texas Instruments' standard, these micro-operation codes are referred to as atomic operations ("AOps"). These AOps, if completed in their entirety, represent completion and graduation of the instruction set instruction, including its opcode and operands if applicable. Note that AOps are approximately comparable to RISC instructions and, thus, are the codes which are connected to various portions of the microprocessor to subsequently initiate execution of the decoded instruction. Thus, AOps are comparable to what is referred to in other architectures as ROps, μOps, or RISC86 instructions. In all events, the decode bits output by decode table memory 24a are used to control various different aspects of the microprocessor operation. Note that table 24a may be of various different types of hardware configurations, such as a read only memory, a PLA, or other such devices.

Microprogram memory 24b is preferably a read only memory, and is often referred to in the art as the microROM or microcode ROM. Microprogram memory 24b stores a certain level of instructions referred to as microcode or microinstruction codes. The microinstruction code is a multiple bit signal, and the value of most if not all of those bits is used to control some aspect of the microprocessor. Further, a micro-operation code often will cause the microprogram memory to be addressed, at which point the microprogram memory will output a microinstruction code. This microinstruction code controls certain microprocessor operations, and may further in turn cause a next successive microinstruction to be addressed and output from the microprogram memory, with the cycle potentially continuing in this fashion until the sequence of microinstructions is complete. Again, therefore, the bits of the microinstruction code control various operational aspects of the microprocessor.

Before discussing read/write memory space 24c, note further that the depiction of decode table memory 24a and microprogram memory 24b is only by way of example, and is for the preferred implementation. Thus, these two separate structures may be merged into a single storage area and/or functionality. For example, in the area of RISC microprocessors, often only a decode table memory is used while a separate level of microinstruction codes are not. As another example, some CISC microprocessors decode the CISC instruction directly to the microprogram memory without a separate decode table memory. Still further, system 10 could include a single merged structure in which case a decode operation occurs in a first event of one or more clock cycles and is followed by the extraction of a microinstruction or microinstructions in a second event of one or more clock cycles. In all events, therefore, one skilled in the art can modify the inventive aspects set forth in this document to these and other instruction architectures.

Turning now to read/write memory space 24c, it may be any one of known storage architectures. For example, the structure may be a random access memory or a content addressable memory, either of which may be a dedicated resource or shared for purposes other than those described below. As yet another alternative, the reader is referred to Section 2, below, which demonstrates the use of a cache structure to serve in the capacity as read/write memory space 24c.

The inventive embodiments described in this document involve the correction, or "patching" as referred to in the art, of both micro-operation codes after they have been stored in decode table memory 24a as well as the microinstruction codes after they have been stored in microprogram memory 24b. Because the embodiments apply to both types of control signals (i.e., micro-operation codes and microinstruction codes), these two types of control signals will from this point forward be collectively referred to as codes unless specified otherwise. For both types of codes, the bit values of the codes control some aspect of the microprocessor. Obviously, therefore, the code bits must be set in the appropriate state (i.e., high or low) to cause the intended effect(s) of the given code. However, due to the increased complexity and design cycle of microprocessors, it is common for microprocessor manufacturers or designers to discover that one or more codes, as originally stored in the corresponding memory 24a or 24b, have improper values. Thus, the embodiments below permit replacement or patch codes to be stored to an alternative memory structure such as read/write memory space 24c, and for these patch codes to be used in lieu of the originally-stored codes when the originally-stored codes would otherwise be selected to control microprocessor operation. Note further, therefore, that to establish a convention of terminology, the codes stored in memories 24a and 24b are referred to as original codes, while the replacement codes stored in memory 24c or the like are referred to as patch codes. These terms are not necessarily used by way of limitation, but to suggest that the codes stored in memories 24a and 24b are those which are originally contemplated as those necessary to operate the microprocessor, while the codes later stored in memory 24c are used to replace certain ones of the original codes when it is determined that such original codes require replacement for whatever reason (e.g., the original code is inaccurate or undesirable).

Figure 2:
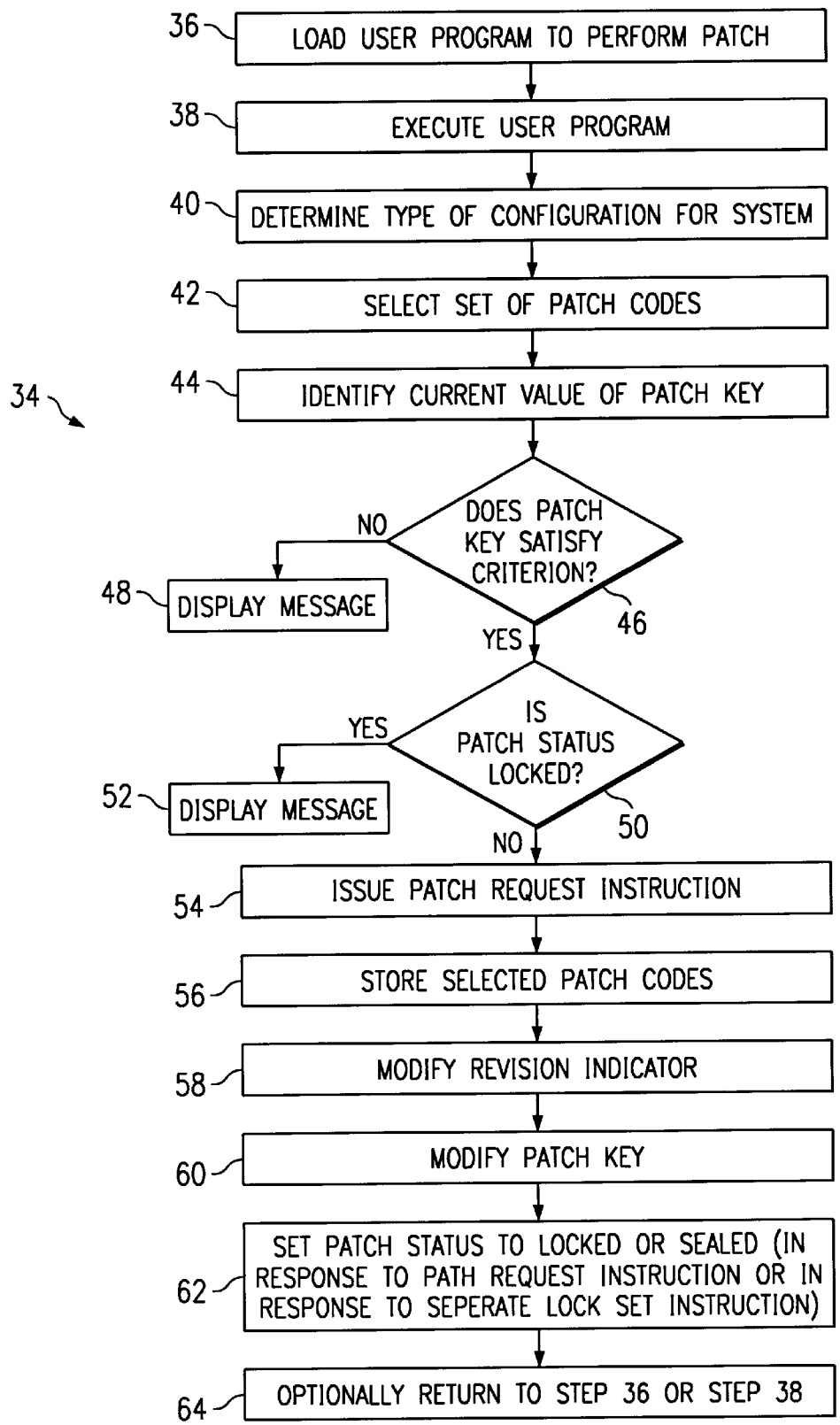
FIG. 2 illustrates a flow chart of a method embodiment to patch codes in connection with a computer system such as that shown in FIG. 1 or FIG. 4.

Having described a computer system as that shown in FIG. 1, FIG. 2 illustrates a flowchart of a method embodiment designated generally at 34 and which may be implemented with the embodiment of FIG. 1 to implement patch codes as that terminology is introduced above. The method of FIG. 2 begins with step 36. Step 36 loads a patch program which automates the patch process. Note that the patch program may operate at any level of software control as shown by the control hierarchy 26 in FIG. 1. Thus, the preferred technique of loading the patch program depends, at least in part, on the particular level for a given patch program. For example, if the patch program is to load and execute at the level of computer BIOS 28 (or hardware abstraction layer (HAL), that is, firmware loaded prior to the operating system load), then the patch program is preferably included with the BIOS memory, such as in a read only memory into which the computer BIOS is often loaded (e.g., ROM or EEPROM) or within a separate storage device which is accessible by the BIOS. As another example, if the patch program is to load and execute at the level of operating system 30, then the patch program is preferably included as a type of device driver of the like which is initialized during the time the operating system is brought up as computer system 10 is powered up. For instance, under one popular IBM-compatible operating system, the patch program may be stored in a driver list such as the "config.sys" file used with WINDOWS. As yet another example, if the patch program is to load and execute at the level of application program 32, then it may be implemented in various manners. For example, a user having a system requiring a patch could be contacted by the manufacturer, and then shipped the patch program in various ways. In one instance, therefore, the manufacturer could send the user the patch program on a stored nonvolatile medium, such as a floppy diskette, a CD ROM, or other readable product. In another instance, the user could download the patch program via a telecommunications link using modem 18 or through some other communication medium or media such as a network (e.g., local area network or wide area network). In this event, once the user has access to the program, he or she stores the patch program according to known techniques, such as by storing it on a hard drive or by inserting a diskette into a disk drive (represented generally by storage device 20) and copying the patch program to the diskette.

Step 38 executes the program loaded in step 36. Thus, the following steps 40 through 64 of method 34 represent operational steps taken by computer 12 in response to the patch program. Before detailing those steps, however, note generally that method 34 operates to select a set of patch codes from some source (e.g., the patch program) and store them in memory (preferably nonvolatile) for subsequent use by microprocessor 24. As detailed below, it is further preferred that method 34 repeats each time computer 12 is initialized (e.g., initially supplied power or reset), and further may be repeated one or more times during the same computer session (i.e., without being powered-down and then powered back up).

Method 34 preferably repeats automatically each time system 10 is re-started, that is, the patch program executed and, hence, the patch codes are selected and stored, automatically on re-initialization of system 10. For instance, under current technology the storage of the selected patch codes is likely to be to a memory which will only maintain the selected patch codes (as well as any other stored information) as power continues to computer 12. As a result, in the present embodiments it is contemplated that once the patch program is loaded as described above, step 36 and the steps following step 36 will be repeated each time computer 12 is powered up so that the previously stored patch codes are once again selected and stored. Alternatively, if only the microprocessor is powered up and down (or reset via a reset pin), the steps following step 36 also will be repeated. In any event, therefore, the first time the patch program is executed, one aspect of it configures the system so that it executes each time computer 12 is powered up, and these subsequent executions of the program need not be invoked by the specific action of the user. One skilled in the art has various techniques available to accomplishing this repeated operation, such as by storing the patch program to the computer hard disk, and creating an automatically executing file to execute the patch program each time power is supplied to the computer.

Method 34 also may be performed two or more times while power continues to computer 12. In other words, in certain instances it may be beneficial for a first set of patch codes to be selected and stored early-on in the power up cycle of computer 12, while a second set of patch codes is selected and stored thereafter. For example, this two-tier operation may occur where the first set of patch codes are necessary to support operating system 30 and, therefore, are selected and stored before operating system 30 is given control of computer 12, while a second set of patch codes are necessary to support some type of application program 32 and, therefore, are selected and stored after the operating system is given control but before the particular application program 32 is executed.

Given the above, it is therefore contemplated that various steps of method 34 are repeatable, either for each power-up of computer 12 or even multiple times while computer 12 is powered. In addition, the particular patch program to effect the steps of method 34 may change in each of these instances. For example, a first patch program may accomplish the preferred method steps at the BIOS level, while a second patch program may accomplish the preferred method steps at the operating system level, and so forth.

Given the above considerations, the following details the various additional steps of method 34. Step 40 determines the type of configuration of computer system 12. Note that the phrase "type of configuration" may include various system parameters. For example, step 40 could identify any and/or all types of peripherals connected to system 12, including for example many of those shown in FIG. 1 like monitor 22, storage 20, modem 18, and the like. Still other parameters affecting the type of configuration may include certain interconnections within system 12, but which are not shown. For example, additional items which may be ascertained may include details concerning microprocessor 24, the bus structure, as well as the type(s) of particular cards or boards within the system, and so forth. With respect to the details concerning microprocessor 24, step 40 could ascertain microprocessor information including its revision and type; indeed, step 40 could operate in conjunction with the teachings set forth in Section 3, below, which demonstrates techniques for microprocessors such that each such microprocessor has its own unique identification. Regardless, then, of the particular parameters examined by step 40, the preferred embodiment is of course supported so that step 40 may sufficiently identify this type of information. For example, some of this information may be acquired by polling the various items, while other information may derive from parameters stored in a memory within system 12. In any event, the information identified by the inquiry of step 40 should be sufficient to identify what code or codes should be patched so as to accommodate that type of configuration. Thus, the particular parameters are interrelated to the particular codes which can be patched, and one skilled in the art is therefore able to identify those codes as well as the corresponding characteristics of the system configuration type which are affected by those particular codes.

Step 42, having access from step 40 of the type of the configuration of system 12, selects a set of patch codes from some source. Note that the source of the patch codes may differ according to the specific embodiment. For example, the patch codes may accompany the patch program and, therefore, would be retrieved from the appropriate nonvolatile medium storing the program, such as storage device 20. As another example, the patch codes may be provided at a time other than when the patch program is provided and also stored to a medium other than the medium storing the patch program. Still further, the patch codes and patch program may be stored to the same medium, but at differing locations. In any event, the patch codes are stored such that they preferably include various sets of patch codes, where different sets apply to different respective types of system configurations. Given the available various sets of patch codes, step 42 selects the appropriate one of those sets.

Step 44 identifies the current value of a patch key which is earlier set in computer system 12. The patch key may operate according to various known techniques as a safeguard to ensure that patch request instruction should be executed and graduated only in certain instances. In other words, the key acts as a type of password so that only proper and authorized issuance of the patch request instruction is followed by execution and graduation of that instruction. For example, the patch key may represent a code stored in a register of microprocessor 24, or in some memory location. Given this example, step 46 evaluates whether the identified patch key satisfies at least one criterion. Thus, if the patch key is a code stored in a register, step 46 may compare the stored value with a new value which is derived in response to the issuance of the patch request instruction. Continuing with this example, if the criterion, or criteria, of step 46 is not satisfied (e.g., the stored value does not match the new value), then the flow continues to step 48. On the other hand, if the stored value matches the new value, step 46 determines that the criterion is satisfied and the flow continues to step 50.

Step 48, having been reached because the key from steps 44 and 46 was not satisfied, may respond in various manners. In the preferred embodiment, a message is generated to the user and output via monitor 22. This message preferably informs the user that the patch codes were not successfully installed into system 10, and may further prompt the user to take additional action (e.g., contact manufacturer). In addition, microprocessor 24 may generate an exception, and optionally terminate any further operation of the current application program. As yet another alternative, step 48 may simply terminate the application program while providing no external indication of such to the user.

Step 50 provides a level of protection, in addition to the key of step 46, by evaluating whether a patch status indicator is locked. Particularly, the preferred embodiment includes a patch status indicator which is also a value which can be stored in a register, a memory location, or the like. Under typical operations, the patch status indicator is unlocked when computer 12 is powered-up. However, as detailed below in connection with step 64, the patch status indicator may be set to locked once a first patch has occurred. Once this patch status indicator is set in this manner, a subsequent patch cannot occur unless the patch status indicator is first unlocked. Thus, the patch status indicator operates as another level of protection. Note further that the patch status indicator may operate in combination with the key described above. Particularly, even if the key satisfies its respective criterion, the steps from step 54 onward (which ultimately produce the next patch) are prohibited if the status indicator is locked. Thus, in the instance that an unauthorized entity either intentionally or unintentionally issues the patch request instruction and has the proper key, they still will not accomplish an additional patch because the patch status indicator is locked. Given the above, if the patch status indicator is locked, the flow continues to step 52, whereas if the patch status indicator is unlocked, the flow continues to step 54.

Step 52 operates in a manner similar to step 48, above. Again, therefore, a message may be generated to the user and output via monitor 22 to indicate that the patch codes were not successfully installed into system 10, an exception may be generated, or no external message may occur. Note further, however, that step 52 may also allow the user to enter corrective information to unlock the patch status indicator. If such an action is taken, the flow returns to step 50 where it will be found that the patch status indicator is now unlocked and the flow will continue to step 54.

Step 54, having been reached because the key criterion is satisfied and the patch status indicator is unlocked, issues an instruction which is referred to in this document as a patch request instruction. In the preferred embodiment, the patch request instruction is included in the instruction set of microprocessor 24, and requests that microprocessor 24 operate to load the patch codes selected in step 42 and in the manner described below (and assuming certain other steps set forth below do not prohibit the loading of the patch codes). Before continuing, however, note that it is stated immediately above that the patch request instruction is included in the instruction set of microprocessor 24; consequently, one skilled in the art will appreciate that microprocessors manufactured and/or used in conjunction with the present embodiments should preferably include one or more instructions sufficient to operate as a request for the following actions to occur. Note further that the particular instruction may operate solely to perform the functionality described here, or may perform additional and/or alternative functionality. For example, the instruction may be one which can write various different values to a register, but the writing of a particular value or values actually causes the load of the patch codes selected in step 42. As yet another example, while the instruction causes the load of the patch codes, it may contemporaneously instigate other operations as well.

Step 56, in response to the patch request instruction from step 54, stores the selected patch codes to a memory space accessible by microprocessor. In the preferred embodiment, the preferable memory space for such storage is memory space 24 which is located on the microprocessor chip. Indeed, for an in-depth discussion of storage of patch codes, the reader is referred to subheading 2, below. One skilled in the art, however, may also choose to store the patch codes in other locations which, in some instances, may also include (either in whole or part) an off-chip memory storage resource.

Step 58 modifies a revision indicator within system 12 to indicate that the patch codes from steps 42 and 56 have been selected and stored. As detailed below, this revision indicator therefore may be reviewed at a subsequent time to demonstrate that a patch has occurred, and to identify the specific set of patch codes that formed the earlier patch. Note that the revision indicator is preferably part of the type of configuration as that term is used above. Thus, if method 34 is repeated at a later time (which is a possibility in the preferred embodiment as mentioned above), then step 40 will again evaluate the system type of configuration and that evaluation will include the revision indicator. Thus, such subsequent evaluation of the type of configuration will identify, among other things, the previous selection and storage of patch code that occurred. Step 58 may be accomplished by various techniques. For example, a value may be stored within the microprocessor, such as within one of its on-chip memories including its register file. In addition, note that step 58 may occur directly in response to the patch request instruction from step 54, or may result from an instruction separate from that patch request instruction.

Step 60 modifies the patch key described above in connection with steps 44 and 46. Thus, in the event that method 34 is repeated a second time without interrupting power to computer 12, the new key will be encountered when steps 44 and 46 are repeated. Consequently, the repeated occurrence of method 34 will only pass beyond step 46 if that repetition satisfies the new criterion corresponding to the new key which was modified during the past occurrence of step 60.

Step 62 sets the patch status indicator described above in connection with step 50 to either a locked or sealed state. Recall that once this patch status indicator is set to a locked state, a subsequent patch cannot occur unless the patch status indicator is first unlocked. Note further that step 62 preferably occurs in response to one of two events. In one embodiment, step 62 simply follows at some time after the issuance of the patch request instruction in step 38. Thus, assuming the flow reaches step 62, the patch status indicator is set to locked. However, in an alternative embodiment, step 62 occurs only in response to the issuance of a separate instruction which, for purposes of identification, is referred to as a set lock instruction. Like the patch request instruction, therefore, the set lock instruction is included in the instruction set of microprocessor 24. Note there are additional advantages to having step 62 occur in response to an instruction separate from the patch request instruction. For example, there may be instances where it is desired to load and store a set of patch codes without locking the patch status indicator. Such an instance may occur where it is anticipated that a second set of patch codes need to be selected and stored during the same powered-up period for computer 12 and, therefore, setting the patch status indicator to locked would otherwise prohibit the second patch from occurring. Still other examples are ascertainable by a person skilled in the art. Note that step 62 also allows the option of setting the patch status indicator to a sealed state. In this instance, step 50 would check for such a setting in addition to checking for a locked state. The sealed state, however, differs from the locked state in that the sealed state cannot be reversed, whereas the locked state can be unlocked so that the method may continue from step 50 to step 54 after such locking. In other words, if a first occurrence of step 62 sets the patch status to sealed, then the next occurrence of step 50 will prohibit any further steps of method 34 and only a re-initialization of system 10 will return the patch status to a state which is not sealed.

Method 34 ends in step 64. Step 64, as suggested above, demonstrates the options that method 34 may be repeated as described above. Thus, the flow may return from step 64 to step 36 such that method 34 repeats in its entirety so that a patch program is loaded and executed; this patch program may be the same as the one which earlier was loaded and executed or, alternatively, may be a different patch program. In either event, the repeated occurrence of method 34 operates according to the steps of FIG. 2 to select a different set of patch codes. Again, this operation may occur either once computer 12 is powered down and then re-booted or, alternatively, during a single period of operation where power is not interrupted. Step 64 further states the alternative flow whereby flow moves from step 64 to step 38. In this event, the same patch program which has once been loaded and issued a first patch instruction now executes a second time, with the remaining steps occurring as described above.

In addition to the steps of FIG. 2 being repeated in the various instances set forth above, note that the preferred embodiment further includes sufficient control and storage for recapturing the selected set of patch codes if the microprocessor receives some sort of power reduction signal such as a power management interrupt. For example, in certain x86 microprocessors, the microprocessor may receive a signal on a pin (e.g., the SMI pin) whereby the processor stores its state to some external storage (e.g., memory) with the expectation that the values stored to the external storage will be preserved. Thereafter, the microprocessor resets itself and retrieves the state stored to the external storage. In the present embodiment, the information stored to the external state in this manner will include the set of patch codes selected and stored according to FIG. 2. Thus, in this event, the selected set of patch codes are immediately retrievable from the external storage without having to repeat the inquiries depicted in FIG. 2.

Figure 3:
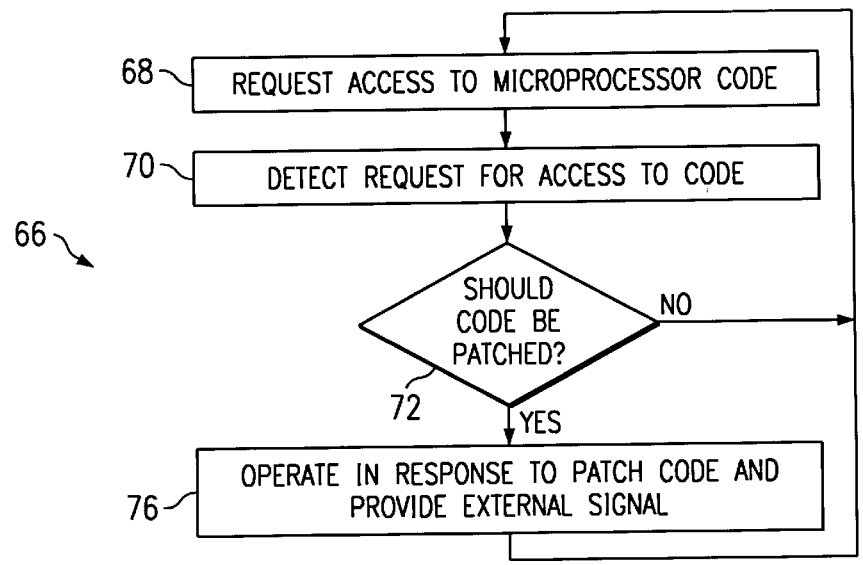
FIG. 3 illustrates a method for selectively using either original codes or patch codes.

FIG. 3 illustrates a method designated generally at 66 and for using the codes selected and stored by method 34 of FIG. 2. Thus, method 66 may occur at any time after method 34 has occurred either at least once, or multiple times as described above. In general, FIG. 3 briefly depicts the alternative use between original codes and patch codes; again, the reader is referred to subheading 2, below, for a more detailed discussion. Turning then to FIG. 3, step 68 represents a request for access to a microprocessor code. Therefore, step 68 represents the request to access either an original micro-operation code stored in decode table memory 24a or a microinstruction code stored in microprogram memory space 24b. For example, the request would occur in connection with the former when an instruction from the instruction set is in decode, while the request would occur in connection with the latter when a microinstruction code is sought from the microprogram memory.

Step 70 detects the request issued in step 68. The particular detection technique may vary. For example, in the context of detecting a microinstruction code, the description set forth in subheading 2, below, discloses a technique whereby detecting the request is accomplished by detecting each issued microaddress. Because a microaddress is input to the microprogram memory to address a microinstruction code, the issuance of a microaddress may be treated as a request for a microinstruction code. One skilled in the art therefore could use this approach, or alternatives ones as well. Further, as an example where the code request is directed to a micro-operation code, it could be detected by monitoring a signal which is active when a valid decode is being performed.

Step 72 determines whether the requested code corresponds to an original code which should be replaced by a patch code. If the determination is negative, operation occurs using the original code and the flow returns to step 68 which awaits the next issuance of a request to access one of the microprocessor's codes. On the other hand, if the determination of step 72 is positive, the flow continues to step 76.

Step 76, having earlier determined that the original code is to be replaced by a patch code, substitutes the patch code in place of the original code. Thereafter, the microprocessor operation, which would have been at the control of the original code, is instead at the control of the substituted patch code. Again, by way of example, the description under subheading 2, below, demonstrates techniques for such action, such as connecting a multiplexer to select between an original microinstruction code and a patch microinstruction code. When the patch microinstruction code is selected in this manner, it is coupled, either directly or indirectly, to the portions of the microprocessor which are controlled by a microinstruction code. Thus, the patch code controls in lieu of the original code.

Step 76, in the preferred embodiment, also outputs an external signal from microprocessor 24 during part or all of the time in which the microprocessor is being controlled by one or more patch codes. Thus, certain ones of the patch codes, or all of the patch codes, can be used to trigger this external signal. Further, therefore, microprocessor 24 preferably includes an additional pin for outputting this signal, or the signal is output via an extra pin which is not already assigned to provide an output signal. In addition, one skilled in the art will appreciate various uses of this external signal. For example, this signal could be used to profile the occurrence of the code or codes which are known to cause the external signal. As another example, this signal could assist the debugging process.

Lastly, note that once step 76 is complete, again the flow returns to step 68 and awaits the next issuance of a request to access one of the microprocessor's codes.

From the above, one skilled in art may appreciate various benefits of the present embodiments. For example, the method of FIG. 2 is easily distributed by an application program; thus, a manufacturer can communicate this method by sending diskettes, or via telephonic communications. The latter approach is particularly helpful given the current trend which gives consumers access to wide scale electronic bulletin boards. As still another benefit, only one microprocessor is involved in the patching techniques and, therefore, the disadvantage associated with requiring a separate console are substantially reduced or eliminated. As yet another example, note that the manufacturer does not have to specifically tailor one patch for all microprocessors but, instead, can transmit sets of patch codes with the preferred method selecting the appropriate patch code set based on the type of configuration of a given user. Further, this feature of selecting between different patch code sets is a more efficient use of system resources. For example, a first type of configuration may require a lesser amount of patch codes than a second type of configuration. Consequently, by selecting the patch codes which pertain only to that system, the additional patch codes of the second type of configuration are not stored to the memory space of the microprocessor and, therefore, do not unduly burden the microprocessor during operation.

While the embodiments of this section have been described in detail, various substitutions, modifications or alterations could be made to the descriptions set forth above without departing from the inventive scope. Indeed, numerous examples have been cited above. In addition to those examples, the microprocessor system of FIG. 11, discussed below, is but one of many configurations which could benefit from the above. As yet another example, the order of the many steps from FIG. 2 could in vary instances be arranged in different fashion, and certain of those steps may be removed while others are added. Still other alternatives will be ascertainable by a person skilled in the art, and all of the above demonstrates the flexibility of the inventive scope which is defined by the claims set forth at the end of this document

2. Operating With Patch Micro-Operation Codes and Patch Microinstruction Codes Stored in Multi-purpose Memory Structure The inventive embodiments described below involve the correction, or "patching" as referred to in the art, of both micro-operation codes after they have been stored in a decode table memory as well as the microinstruction codes after they have been stored in microprogram memory. Because the embodiments apply to both types of control signals (i.e., micro-operation codes and microinstruction codes), these two types of control signals will from this point forward be collectively referred to as codes unless specified otherwise. For both types of codes, the bit values of the codes control some aspect of the microprocessor. Obviously, therefore, the code bits must be set in the appropriate state (i.e., high or low) to cause the intended effect(s) of the given code. Due to the increased complexity and design cycle of microprocessors, it is common for microprocessor manufacturers or designers to discover that one or more codes, as originally stored in the corresponding storage structure have improper values. Thus, the embodiments below permit replacement or patch codes to be stored to an alternative multi-purpose memory structure, and for these patch codes to be used in lieu of the originally-stored codes when the originally-stored codes would otherwise be selected to control microprocessor operation. Consequently, improved microprocessor performance is achieved without having to physically replace the entire microprocessor.

Having described the effect of codes in general, the following illustrations are directed to microinstruction codes by way of example; however, as noted above, micro-operation codes are also commonly stored and used in a manner similar to microinstruction codes and, therefore, one skilled in the art will appreciate the modification and application of the following embodiments to accommodate either or both of microinstruction or micro-operation codes.

Figure 4:
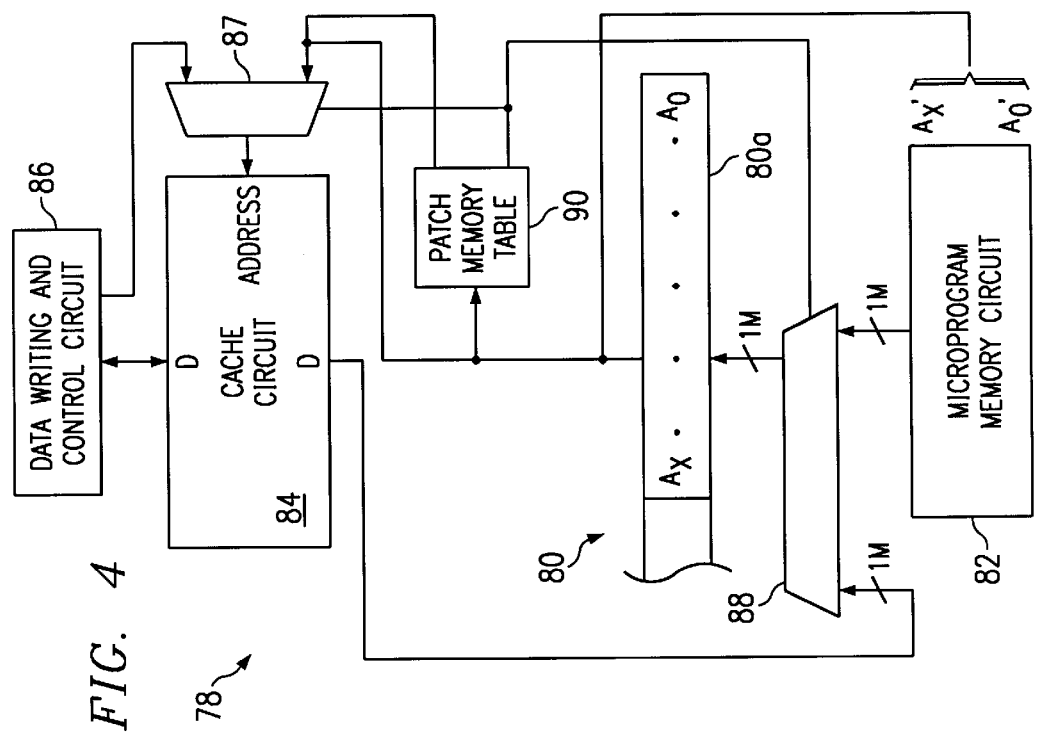
FIG. 4 illustrates a system including a microprogram memory to output an original microinstruction as a next microinstruction or, alternatively, a cache circuit to output a patch microinstruction as a next microinstruction.

FIG. 4 illustrates a schematic of a microinstruction producing system designated generally at 78 and which is preferably included in a microprocessor system such as that described below in connection with FIG. 4. Before discussing the details of FIG. 4, note generally the following aspects. System 78 successively produces microinstruction codes which include bits for controlling numerous aspects of the overall microprocessor operation. Each produced microinstruction code is designated in FIG. 4 as a microinstruction code 80. Generally, each microinstruction code 80 is selected from one of two sources, namely, a microprogram memory circuit 82 or a cache circuit 84. Thus, one skilled in the art should appreciate that system 78 is temporal in nature, and that a microinstruction code 80 at one time will be followed by a succeeding microinstruction code 80, and so forth. In addition, the embodiments described in this document pertain to patching microinstruction codes. Thus, to establish a convention of terminology, note that the microinstruction codes stored in microprogram memory circuit 82 are referred to as original microinstruction codes, while the microinstruction codes stored in cache circuit 84 are referred to as patch microinstruction codes. These terms are not necessarily used by way of limitation, but to suggest that the microinstruction codes stored in microprogram memory circuit 82 are those which are originally contemplated as those necessary to operate the microprocessor, while the microinstruction codes stored in cache circuit 84 are used to replace certain ones of the original microinstruction codes when it is determined that such original microinstruction codes require replacement for whatever reason (e.g., the microinstruction code is inaccurate or undesirable).

Each successive microinstruction code 80 includes various control bits. In the preferred embodiments the information within microinstruction code 80 includes a group of bits 80a which either directly or indirectly forms the microaddress of the next potential microinstruction code 80 to be generated by system 78. For purposes of illustration, FIG. 4 depicts this bit group 80a as bits $A_0$ through $A_x$. Clearly, microinstruction code 80 may include numerous other bits to control various operation(s) of the microprocessor. Indeed, current microinstruction codes may be found on the order of 256 bits in length, where group 80a is only ten to twelve of the 256 total bits. Thus, these additional bits may be chosen by a person skilled in the art to effect other functionality, but are not shown in FIG. 4 to simplify the illustration.

Microprogram memory circuit 82 preferably includes a read only memory on the order of 4 k microinstruction codes in size, and includes circuits known in the art to address and output the microinstruction codes it stores. For purposes of simplification, these circuits are not shown while some of them are detailed later in connection with FIG. 5. At this point, it only need be noted that microprogram memory circuit 82 is operable to output a microinstruction code in response to a microaddress having bits $A_x'$ through $A_0'$ (detailed later). Note that these bits $A_x'$ through $A_0'$ are derived from bits $A_x$ through $A_0$ in microinstruction code 80 and, therefore, common subscripts are used for both microaddresses. In other words, and as mentioned above, the current bit group 80a of a microinstruction code 80 is used either directly or indirectly to form the next microaddress $A_x'$ through $A_0'$. Note also that although microprogram memory circuit 82 is preferably a read only memory, various other storage circuits could be used, such as random access memories, PLAs, or other storage circuits developed by a person skilled in the art. The original microinstruction codes are stored in microprogram memory circuit 82 using known techniques for programuming a read only memory. Additionally, if an alternative type of memory is used as the microprogram memory, then again the original microinstruction codes may be stored according to known techniques.

Cache circuit 84 may be any type of cache architecture ascertainable by a person skilled in the art. However, a preferred embodiment of cache circuit 84 is detailed later in connection with FIG. 5. The patch microinstruction codes are stored in cache circuit 84 using data writing and control circuit 86. Particularly, circuit 86 is bi-directionally connected to read/write data in connection with cache circuit 84. Further, circuit 86 is connected to provide an address to a multiplexer 87, and the output of multiplexer 87 is connected to the address input of cache circuit 84. Thus, when patch microinstruction codes are to be written to cache ciruit 84, data writing and control circuit 86, outputs the address to be written to multiplexer 87, and multiplexer 87 is controlled as described below to connect the address(es) to cache circuit 81. Importantly, however, note that data other than patch microinstruction codes may be written to, or read from, cache circuit 84 by data writing and control circuit 86. Thus, circuit 86 is a block representation of any type of source ascertainable by a person skilled in the art to write data to a cache system. For example, a cache is typically used to reflect values in a larger memory or possibly of microprocessor registers and, thus, circuit 86 could write and read such information to cache circuit 84. In all events, this and other information may be written to and read from cache circuit 84 (in addition to the patch microinstruction codes).

In the preferred embodiment, note that once a patch microinstruction code is stored to cache circuit 84, it is preferably distinguished from other cached data. This information is beneficial, for example, so that a patch microinstruction code is not interpreted as some other type of data, or so that it is not unintentionally overwritten. In this regard, note that some current cache architectures use the so-called MESI (modify, exclusive, shared, invalid) standard by setting bits or flags to indicate the state of each of the cache locations. For more information on MESI, the reader is referred to Chapter 9 of *The Indispensable Pentium Book*, by Hans-Peter Messmer (published by Addison-Wesley Publishers Ltd in 1995), which is hereby incorporated herein by reference. As known in the art, this standard typically ensures proper memory coherency. However, given that cache circuit 84 has the additional functionality of storing patch microinstruction codes, the present embodiment includes an additional indicator to prohibit overwriting a patch microinstruction code. This additional indicator may be referred to as a locked indicator, and is combined with the invalid indicator from the MESI standard to protect the patch microinstruction code. Particularly, once a patch microinstruction code is stored in cache circuit 84, its state is set to invalid and its status is set to locked. As a result of the invalid status, any other portion of the microprocessor which examines this status is notified not to treat the information as regular cached data. However, normally an invalid location may be overwritten with valid data. Thus, by adding a locked indicator, any other portion of the microprocessor which examines this status is prohibited from writing to (or replacing) the cache location and, therefore, the integrity of the patch microinstruction code is preserved.

Turning now to system 78 of FIG. 4 in greater detail, the data output of microprogram memory circuit 82 is connected to an input of a multiplexer 88 so that one microinstruction code is output via this connection to multiplexer 88. Similarly, the data output of cache circuit 84 is connected to another input of a multiplexer 88, also so that one microinstruction code is output via this connection to multiplexer 88. The control input of multiplexer 88 is connected to the output of a patch memory table 90. The output of multiplexer 88 provides the next microinstruction code 80. Note that the outputs of cache circuit 84 and microprogram memory circuit 82, as well as microinstruction code 80, may be stored in any type of storage device or connected to a buffer, or may be directly connected to the relevant portions of the microprocessor which respond to the bits of the microinstruction code.

Turning now to bit group 80a of microinstruction code 80, it is coupled either in part or in whole to the address inputs of three different components: (1) microprogram memory circuit 82; (2) cache circuit 84; and (3) patch memory table 90. The precise number of bits from group 80a which are coupled in this manner depends on various implementation details, and a preferred embodiment is detailed below in connection with FIG. 5. With respect to patch memory table 90, recall from above that one of its outputs is connected to the control input of multiplexer 88; note also that this same output is further connected to the control input of multiplexer 87 as well. In addition to providing control signals, in one embodiment patch memory table 90 includes a second output which is connected to provide a second portion of the address to multiplexer 87, where that second portion combines with group 80a of microinstruction code 80. Note that patch memory table 90 is preferably a random access memory ("RAM"), but may be an alternative type of memory such as a content addressable memory ("CAM").

The operation of system 78 is as follows. As mentioned above, system 78 generates a microinstruction code 80 which it selects either from the original microinstruction codes stored in microprogram memory circuit 82 or from the patch microinstruction codes stored in cache circuit 84. Each of these scenarios is described below. Before proceeding, note that in each instance, the next microinstruction code to be generated (i.e., either original or patch) is addressed, either directly or indirectly, by group 80a of the current microinstruction code 80. Particularly, for a given microinstruction code 80, its group 80a of bits will provide, either directly or indirectly, the next address $A_0'$ through $A_x'$ to microprogram memory circuit 82 and to cache circuit 84 (via multiplexer 87). For example, FIG. 5 discussed below depicts how certain ones of these bits (i.e., $A_2$ through $A_x$) directly form a portion of the next microaddress, while the second portion of the next microaddress may be generated indirectly and may depend on the item being addressed. For example, the second portion of the microaddress as applied to microprogram memory circuit 82 may derive indirectly from other bits (i.e., $A_0$ and $A_1$). As another example, the second portion of the microaddress as applied to cache circuit 84 may derive from patch memory table 90. In all events, a next microaddress is generated based on a portion of the bits in the current microinstruction code 80.

Exploring now the instance where the next microinstruction code 80 should be an original microinstruction code (as opposed to a patch microinstruction code), microprogram memory circuit 82 outputs a next microinstruction code in response to the microaddress derived from the current microinstruction code 80. Moreover, multiplexer 88, under control of patch memory table 90 as detailed below, selects the output of microprogram memory circuit 82 and outputs its selected data. Therefore, the next microinstruction code 80 is an original microinstruction code output by microprogram memory circuit.

Exploring now the instance where the next microinstruction code 80 should be a patch microinstruction code (as opposed to an original microinstruction code), recall that address group 80a is connected to the address inputs of both patch memory table 90 and multiplexer 87. Patch memory table 90 thus identifies that the next microaddress derived from group 80a is the address of a microinstruction code which should be replaced by a patch microinstruction code.

For example, if table 90 is a RAM, then each location corresponding to a microaddress which is to be replaced with a patch microinstruction code is set to a state to indicate that a patch microinstruction code is to be output in response to the current microaddress. In addition, each such location is also loaded with a portion of the address bits to address the patch microinstruction code in cache circuit 84. Consequently, this set state is output by the RAM to multiplexers 87 and 88, and the address portion from table 90 combines with group 80a to a data input of multiplexer 87. As a result of the set state from table 90, multiplexer 87 selects the combined address from group 80a and table 90 and applies this mnicroaddress to cache circuit 84. In response, cache circuit 84 outputs the addressed patch microinstruction code. In addition, recall that the set state from table 90 also controls multiplexer 88. Particularly, when set as in the current example, multiplexer 88 selects the data from its input which is connected to cache circuit 84. Thus, one skilled in the art will appreciate that the changed control to multiplexer 88 causes it to select and output the microinstruction code from cache circuit 84; consequently, the next microinstruction code 80 is a patch microinstruction code from cache circuit 84. Recall also from above that table 90 may be an alternative type of detection configuration. For example, if table 90 is a CAM, then each location corresponding to a microaddress which identifies a microinstruction code to be replaced with a patch microinstruction code is written to the CAM, along with a corresponding signal to be output in response to a "hit" in the CAM. Again, this corresponding signal would comprise a control signal for multiplexers 87 and 88, and in the preferred embodiment would further include a portion of the address bits for cache circuit 84. In either event, therefore, patch microinstruction table 90 is a memory table which can detect those microaddresses corresponding to patch microinstruction codes so those patch microinstruction codes can be output by cache circuit 84 and selected by multiplexer 88.

Recall also that data other than patch microinstruction codes may be written to, or read from, cache circuit 84 by data writing and control circuit 86. Thus, cache circuit 84 is a multi-purpose cache in that it is operable to store at least two types of information, namely, a first type which is patch codes and a second type which is something other than patch codes. For example, the second type of information may include instructions, data, a combination of instructions and/or data, address translation or branch prediction information (i.e., so-called I-cache, D-cache, unified cache, TLB and BTB). Further, having now explained the detailed interconnects of FIG. 4, note that the second type of information (i.e., the non-patch code information) occurs where circuit 86 outputs one or more addresses to multiplexer 87. In these instances, the output of table 90 which is Acontrolling multiplexer 87 would be in a state opposite to the set state described above. Thus, multiplexer 87 couples the microaddresses from circuit 86 to cache circuit 84 and, at that point, circuit 86 can either write data to, or read data from, cache circuit 84. Note further that additional control circuit may be included within, or coupled to, multiplexer 87 for various reasons. For example, additional control may be used to sort through priorities of access to cache circuit 84.

From the above, one skilled in the art will appreciate that table 90 causes a different reaction in response to detecting that an issued microaddress is requesting either an original microinstruction code or a microinstruction code which should be patched. Thus, system 78 selectively generates microinstruction code 80 by selecting between the original microinstruction codes stored in microprogram memory circuit 82 and the patch microinstruction codes stored in cache circuit 84. Thus, before proceeding with additional preferred details, note at this point some of the advantages of system 78 over the prior art. For example, cache circuit 84 is preferably at least as large as microprogram circuit 82. Therefore, in the worst case scenario where all of the original microinstruction codes require patching, cache circuit 84 is sufficiently large so that it may store all of the patch microinstruction codes without dynamic loading or changing of its contents after initially being loaded with those patch microinstruction codes. Additionally, in the more likely event that only a portion of cache circuit 84 is required to store patch microinstruction codes, the remainder of cache circuit 84 is available to receive other data from data writing and control circuit 86 and, therefore, to be cached according to principles known in the art. Indeed, many current microprocessors already have one or more levels of cache memories on the microprocessor integrated circuit, and these existing cache memories may be modified in the manners described in this document to achieve the inventive concepts and resulting benefits. Still further, by using cache circuit 84 as a resource for patch microinstruction codes, there is a reduced need on the designer to estimate the amount of patching which will be required after the original microprocessor is being manufactured. As yet another benefit, the reduced amount of additional hardware saves valuable space on the microprocessor.

Before proceeding, note further that the information in patch memory table 90 also operates, in part, to confirm that information at a given location in cache circuit 84 is a patch microinstruction code. Particularly, recall from above that once a patch microinstruction code is stored in cache circuit 84, the location corresponding to that information is set to invalid and locked. In some instances, such an indication could be used for an alternative purpose (e.g., to disable a cache line from ever being used due to a hardware problem). However, if the status of invalid and locked is detected, and further if table 90 identifies the address of that location, having the invalid and locked status, then it may be concluded that the information in the location is a patch microinstruction code. Note further that alternative techniques may be used to reach this conclusion; for example, an additional bit or bits could be added to the information stored in the cache line to represent that the information included a patch code rather than some other type of information.

In addition to the preferred operation of system 78 as described, note in the preferred embodiment that additional circuits and control signals may be included to accommodate tiring considerations. For example, in the instance that patch memory table 90 indicates that the next microinstruction code should be from cache circuit 84, then it is preferable that the microinstruction code fetch stalls for the required number of clock cycles to allow cache circuit 84 to access and output the patch microinstruction code. Note that it is possible for the entire system to stall for zero clock cycles if either cache circuit 84 is fast enough, or if the system clock is slowed down and appropriate measures are taken to cause cache circuit 84 to access the next microinstruction code in that same cycle (i.e., rather than beginning at the next clock cycle).

Figure 5:
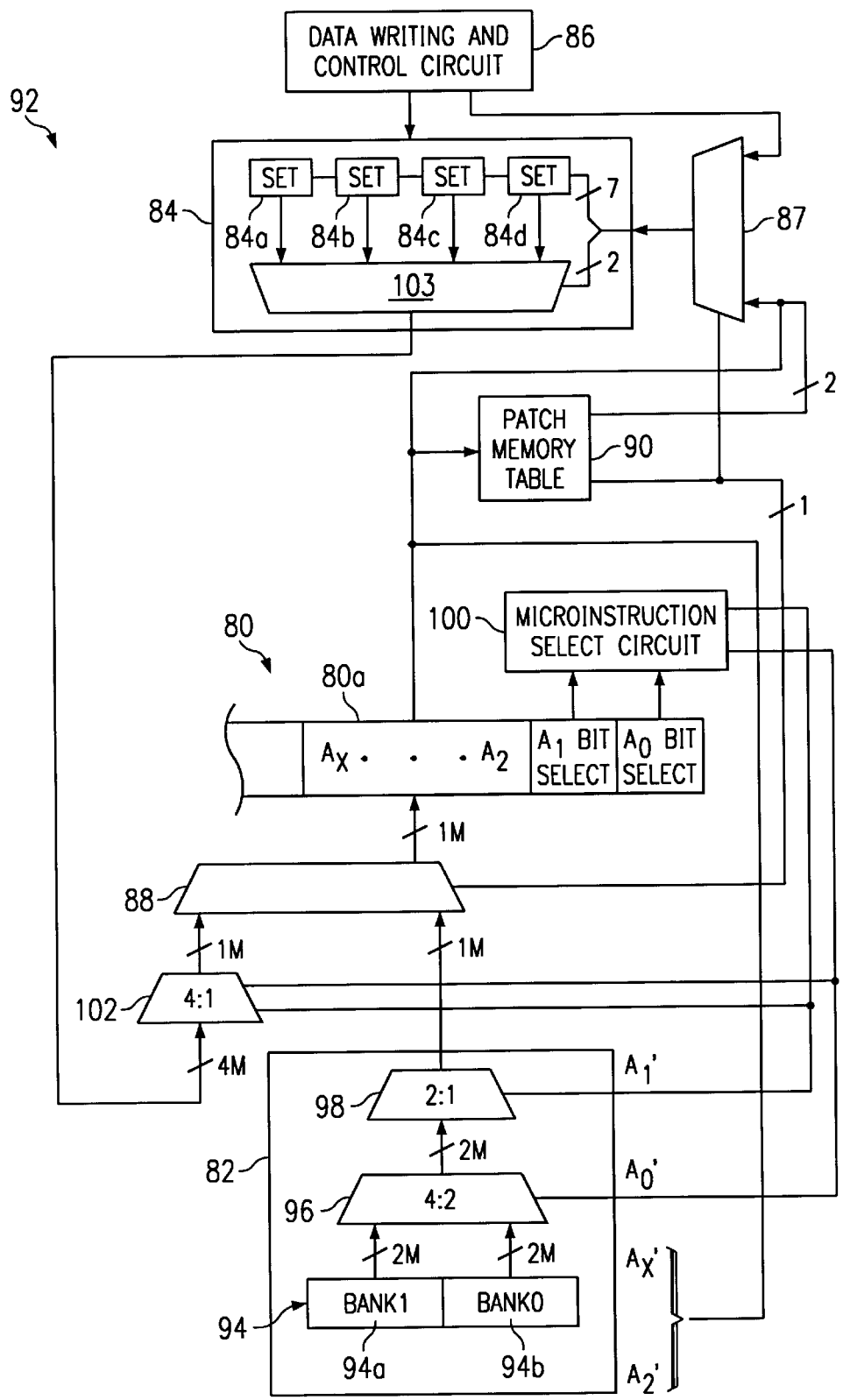
FIG. 5 illustrates the preferred embodiments of the microprogram memory and the cache circuit such that each stores more than one microinstruction per line.

FIG. 5 illustrates a system 92 similar in various respects to system 78 of FIG. 4, but with additional details of a preferred embodiment. Note that where systems 78 and 92 have common features, reference numerals from FIG. 4 are carried forward to FIG. 5. In addition, those features which are common are not described a second time in great detail, so the reader is referred to the above discussion for an appreciation of those features as well as their corresponding benefits and improvements over the prior art.

Certain aspects of FIG. 5 which are not shown in FIG. 4 include details within microprogram memory circuit 82, the $A_0$ and $A_1$ bit select fields of group 80a, and a microinstruction select circuit 100. For an in-depth discussion of these features as well as the corresponding operation and benefits, the reader is referred to U.S. Provisional Patent application Ser. No. 60/009,801 filed Jan. 10, 1996, entitled "Circuits, Systems, And Methods For Reducing Microprogram Memory Power For Multiway Branching", and which is hereby incorporated herein by reference. Briefly, however, note that microprogram memory circuit 82 is shown to include a storage circuit 94 for storing the microinstruction codes, and which is divided into two separate banks 94a and 94b. Each of banks 94a and 94b is operable to concurrently output two microinstruction codes and, therefore, up to four microinstruction codes may be output from storage circuit 94 at one time. Both banks 94a and 94b are connected to a 4:2 multiplexer 96 which, therefore, outputs a total of two microinstruction codes. The output of multiplexer 96 is connected to a multiplexer 98 which outputs a single microinstruction code to multiplexer 88 as shown in FIG. 4. Microinstruction code 80 output by multiplexer 88 includes a bit group similar to that of FIG. 4, but the least two significant bits are replaced with the $A_1$ and $A_0$ bit select fields. The $A_1$ and $A_0$ bit select fields are connected to microinstruction select circuit 100 which, in response to the bit select fields, outputs the least two significant bits, $A_0'$ and $A_1'$, of the next microaddress. These least two significant bits control multiplexers 96 and 98, respectively, as well as an additional multiplexer 104 described below. Without discussing the many additional details of the above-incorporated patent application, note generally that the additional features now mentioned allow greater efficiency for branching from a current microinstruction code to any one of four potential next microinstruction codes.

System 92 further illustrates preferred details within cache circuit 84. Particularly, in the preferred embodiment, cache circuit 84 includes four sets 84a, 84b, 84c, and 84d. Each set is concurrently addressable and operable to store one line of cache data, and each set includes 876 lines of data. In the preferred embodiment, it is desirable to obtain the same number of microinstruction codes from cache circuit 84 as are available from storage circuit 94. In this regard, each line of cache data in each set 84a–d is preferably equal in size to the length of four microinstruction codes (e.g., 1024 bits or 128 bytes). Because 128 different lines may be addressed, a total of seven bits (i.e., $2^7=128$) are preferred for addressing cache circuit 84. Consequently, in the preferred embodiment, bits $A_2$ through $A_8$ from microinstruction code 80 are coupled to cache circuit 84. Recall that one of the benefits of the present embodiments is that the patch microinstruction codes are stored in a memory (i.e., cache circuit 84) which also may store information which is not a patch microinstruction code. Thus, in the event that such information is desired, access to such information is through data writing and control circuit 86, and data cache circuit 84 is addressed, via selection of multiplexer 87, by bits [15:7] of the data address for the microprocessor.

Each of the four sets in cache circuit 84 is connected to the input of a multiplexer 103. Additionally, recall that patch memory table 90 connects a portion of the cache address through multiplexer 87. In the embodiment of FIG. 5, this portion is two address bits connected, through multiplexer 87, to the control inputs of multiplexer 103. As a result, multiplexer 103 selects a line of cache data (i.e., up to four patch microinstruction codes) from each of sets 84a, 84b, 84c, and 84d, and multiplexer 103 selects one of those lines to output the multiple patch microinstruction code(s) to the input of multiplexer 102. Multiplexer 102 is controlled by the two least significant microaddress bits, $A_0$ and $A_1$, from microinstruction select circuit 100. Thus, in response to those bits, multiplexer 102 outputs one of the four patch microinstruction codes to multiplexer 88. As described in connection with FIG. 4, above, multiplexer 88 may then select between the original microinstruction code from microprogram memory circuit 82 and the patch microinstruction code from cache circuit 84, with the selected microinstruction code being the next microinstruction code 80. In addition, system 92 may further include, as discussed with system 78 above, additional circuits and signals to achieve favorable timing when patch microinstruction codes are retrieved from cache circuit 84.

Figure 6:
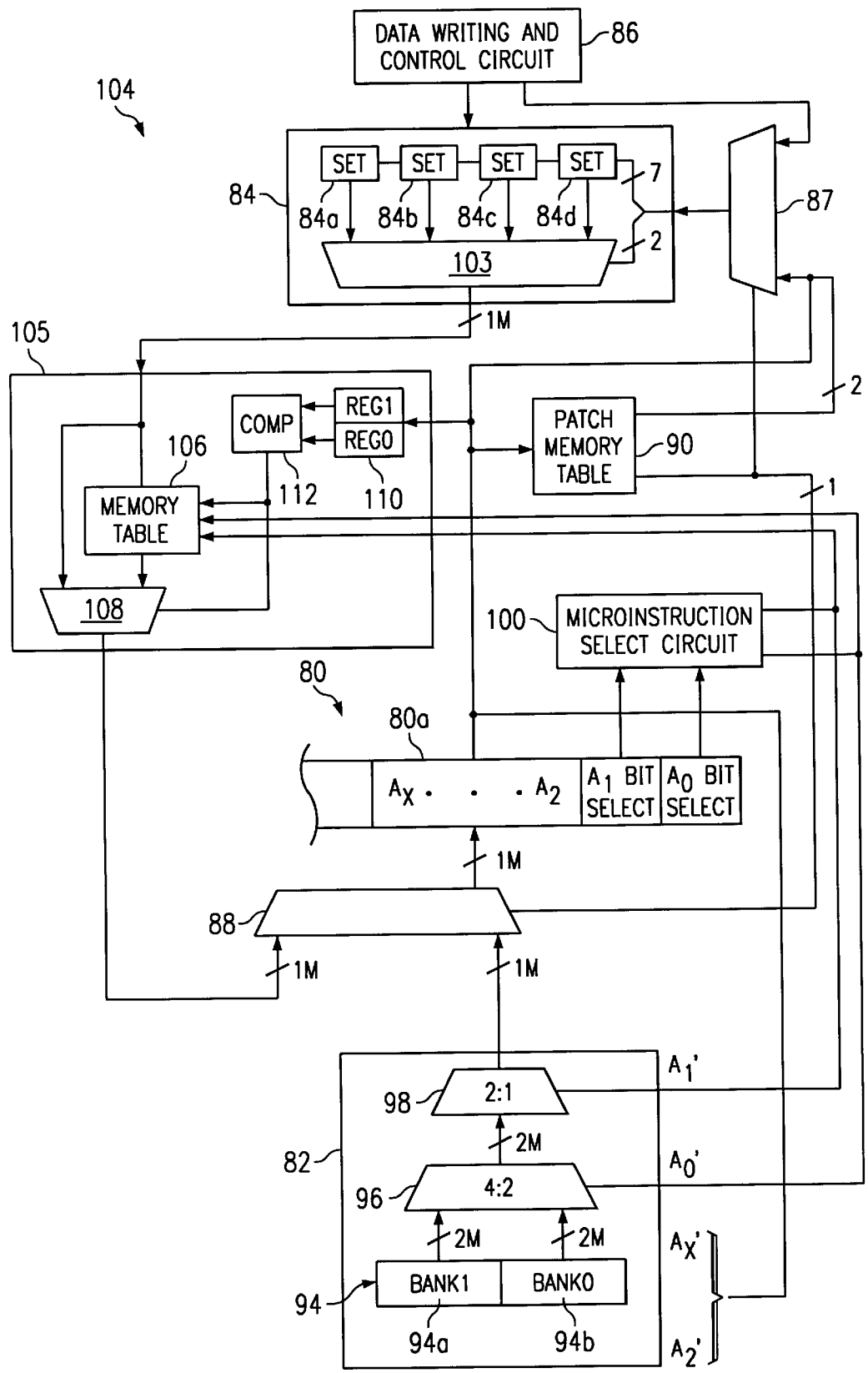
FIG. 6 illustrates the system of FIG. 5 and further includes a circuit for reducing potential delay in retrieving patch microinstructions from the cache circuit.

FIG. 6 illustrates yet another alternative system designated generally at 104, where system 104 outputs patch microinstruction codes from cache circuit 84 in a different manner than in FIG. 5, and also includes another embodiment feature, namely, a delay reduction circuit 105 connected between cache circuit 84 and multiplexer 88. Delay reduction circuit 105 includes a memory table 106 connected to receive data from cache circuit 84 and address bits from microinstruction select circuit 100. Memory table 106 is also controlled by the output of a comparator 112. The data from cache circuit 84 is also connected to a first data input of a multiplexer 108, while the second data input of multiplexer 108 is connected to the data output of memory table 106. Within circuit 105, address group 80a is connected to a register file 110 which includes two registers, denoted REG0 and REG1. The outputs of register file 110 are connected to the inputs of comparator 112 which, in addition to connecting to control table 106 as mentioned above, has an output connected to the control input of multiplexer 108.

In operation, delay reduction circuit 105 operates to expedite the availability of a patch microinstruction code when the microaddress of that patch microinstruction code is within a certain number of the microaddress of the immediately preceding patch microinstruction code. Before detailing this operation, note that it has particular applicability to an embodiment where more than one microinstruction code may be retrieved from cache circuit 84. Further, while FIG. 5 describes such an embodiment, system 104 retrieves more than one microinstruction code in an alternative manner. Particularly, in system 104, each line of cache sets 84a–d is only one microinstruction code wide (as opposed to four microinstruction codes wide as in system 92 of FIG. 5). However, when a particular set is selected by addressing cache 84, additional circuitry (not shown) operates to address a total of four successive cache lines within the selected set. The four lines may be either aligned with the memory system, or may commence with the first line and simply address the three following lines for the given set. In either instance, a total of four microinstruction codes are again obtained, but here they are successive rather than retrieved in a single instance as in the case of FIG. 5.

As stated above, given a group of microinstruction codes from cache circuit 84, delay reduction circuit 105 improves performance in various instances. The specific operation toward this end is best understood by considering the example where a first microaddress is immediately followed by a second microaddress, and both such microaddresses address patch microinstruction codes stored in cache circuit 84.

When a first microaddress is issued (i.e., via the combination of a portion of microinstruction code 80 and the 2 bit output from table 90), cache circuit 84 outputs a corresponding patch microinstruction code from one of sets 84a–d. At this point, the first patch microinstruction code is connected to memory table 106 as well as a first input of multiplexer 108. As better understood below, because the microinstruction code is the first in the sequence of four patch microinstruction codes, multiplexer 108 is controlled to output this first patch microinstruction code to multiplexer 88 and, therefore, this first patch microinstruction code is selected as the next microinstruction code 80 as in the case of FIG. 5. In addition to these operations, however, note further that register file 110 stores the microaddress of this first patch microinstruction code. For example, assume that this microaddress is stored in register REG0.

In addition to retrieving the first patch microinstruction code as stated above, an additional three patch microinstruction codes are also retrieved from cache circuit 84. The additional three patch microinstruction codes are stored in memory table 106, such that an overall group of four microinstruction codes are stored at this point. Next, when the second microaddress is issued, it also is stored in register file 110, but this second address is stored in register REG1. At this point, therefore, register file 110 (or a like structure) has two successive microaddresses for sake of comparison. Next, comparator 112 evaluates the relationship between the first and second microaddresses. For the embodiment of FIG. 6, for example, comparator 112 would evaluate whether the successive microaddresses are within a group of four microaddresses.

If the comparison by comparator 112 is positive, then it may be concluded that memory table 106 already stores the group that is now being requested a second time by the second successive microaddress. As a result, comparator 112 controls memory table 106 to accept an address to address one of the four patch microinstruction codes it stores. More particularly, in the embodiment of FIG. 6, bits $A_1'$ and $A_0'$ from circuit 100 at this point select one of the four patch microinstruction codes stored in memory table 106, and the selected patch microinstruction code is output to a second input of multiplexer 108. Next, comparator 112 also controls multiplexer 108 to select the data at its second data input and, therefore, this selected patch microinstruction code is selected as the next microinstruction code 80. From the above, one skilled in the art will appreciate that circuit 37 can further expedite the ultimate output of a patch microinstruction code. Particularly, where successively requested instructions fit within the criteria imposed by comparator 112, the entire system (e.g., system 92 or system 104) need not wait for full access to cache circuit 84.

If the comparison by comparator 112 is negative, then it may be concluded that memory table 106 does not currently store the group that is now being requested by the second successive microaddress. As a result, comparator 112 causes multiplexer 108 to select the patch microinstruction code output by cache circuit 84. In this event, therefore, once cache circuit 84 has sufficient time to output the patch microinstruction code, it is passed to multiplexer 88 which may select it as described above.

While the above example deals with the criterion of a group of four patch microinstruction codes, one skilled in the art may readily alter the described embodiment to accommodate other criteria including, for example, larger or smaller groups of patch microinstruction codes. Still further, circuit 105 could include additional small memories such as memory 106 to accommodate microaddresses which are not immediate successors of one another, but in any event permit a secondary and temporary storage area for patch microinstruction codes previously retrieved from cache circuit 84. Still further, note that the storage and comparison functions of circuit 105 may be accomplished by alternative structures. For example, circuit 105 could comprise a CAM which stores a group of cache lines along with their corresponding address. Moreover, instead of using a comparator, the next microaddress, or a portion of that address (e.g., all bits other than some of the least significant bits) could be applied to the CAM. If that address caused a hit in the CAM, then it may be concluded that a group of nicroinstruction codes previously retrieved from cache circuit 84 is already stored in the CAM and, hence, that group (or a lesser group from that group) may be forwarded without waiting for the cache to perform its currently-requested access and output.

Figure 7:
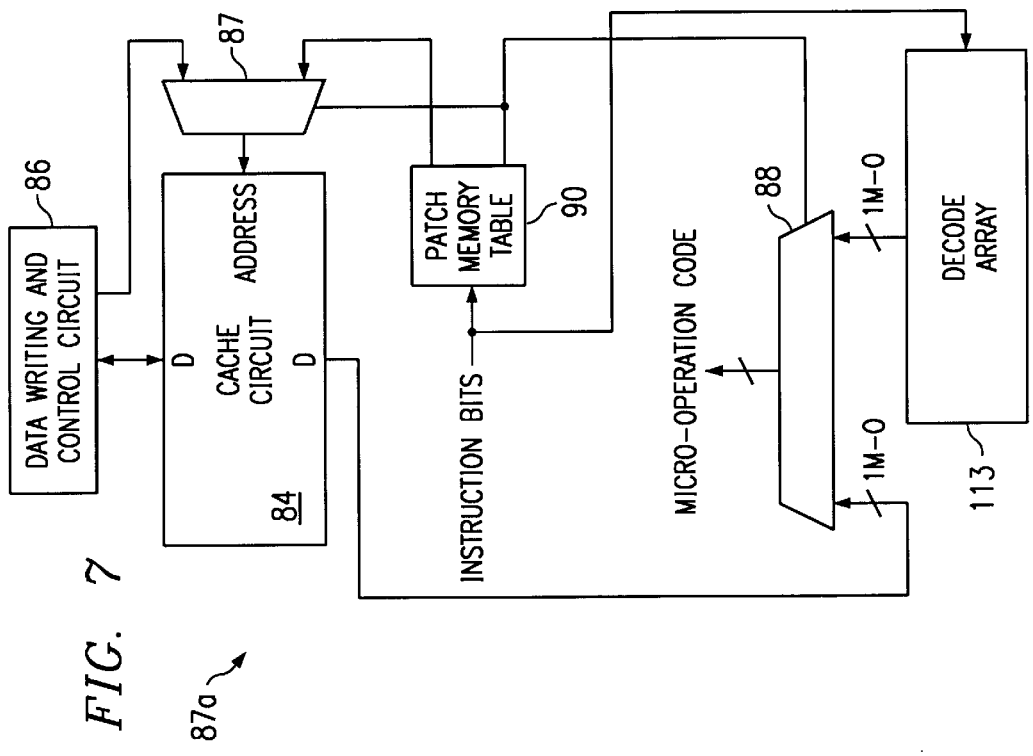
FIG. 7 illustrates a system including a decode array to output an original micro-operation code as a next micro-operation code or, alternatively, a cache circuit to output a patch micro-operation code as a next micro-operation code.

As stated before the details of FIG. 4, various microprocessors operate in response to micro-operation codes either in addition to, or in lieu of, microinstruction codes. Given these instances, FIG. 7 illustrates yet another inventive embodiment designated generally at 78a where such micro-operation codes may selected in a manner which in many respects resembles that described above. Indeed, for ease of understanding, the common functional blocks in FIGS. 4 and 7 use like reference numerals. Thus, FIG. 7, like FIG. 4, includes a cache circuit 84 which receives information, as selected by a multiplexer 87, from either a data writing and control circuit 86 or a patch memory table 90.

The differences between FIGS. 7 and 4 are appreciated in that the former concerns micro-operation codes while the latter concerns microinstructions. Thus, instead of a microprogram memory circuit 82 (like in FIG. 4), system 78a includes a decode array 113. Decode array 113 receives a group of instruction bits, decodes them in according to whatever appropriate manner, and outputs a corresponding set of original micro-operation codes (abbreviated "M-O" on the Figure). Note that this set may include one or more micro-operation codes. Further, instead of storing patch microinstructions in cache circuit 84, system 78a stores patch micro-operation codes in cache circuit 84. As a result, and given the extensive explanation set forth in connection with FIGS. 4 through 6, one skilled in the art will readily appreciate that multiplexer 88 is operable to select between an original micro-operation code output by decode array 113 and a patch micro-operation code output by cache circuit 84. Again, the control of selection is determined by information stored in patch memory table 90 such that the stored information identifies those instructions which, when decoded, should be replaced by a patch micro-operation code rather than permitting the microprocessor to operate in response to the originally stored micro-operation code. Once the appropriate micro-operation code is selected by multiplexer 88, it is output by that multiplexer and may then be used to control microprocessor operation according to known principles. Given the above relationship between FIGS. 4 and 7, one skilled in the art will further appreciate the possibility of modifying system 78a in accordance with various other of the principles taught above in connection with FIG. 5 and 6.

While the embodiments of this section have been described in detail, various substitutions, modifications or alterations could be made to the descriptions set forth above without departing from the inventive scope. For example, the embodiments of FIGS. 4 through 6 illustrate a technique for forming a next microaddress from a current microaddress (sometimes referred to as always-branching), yet many of the aspects above could apply to alternative microaddress generation techniques, such as incrementing counters or others ascertainable by a person skilled in the art. As another example, various types of address comparison or detection techniques could be used for the functionality of patch memory table 90. As another example, various device sizes as set forth above may be adjusted to accommodate a particular implementation. As yet another example, additional bits could be used within a current microinstruction code to directly address cache circuit 84 without requiring entries in a separate table to output a portion of that address (e.g., table 90 outputs two address bits in FIGS. 5 and 6). As still another example, while patch codes have been described above to replace existing codes, as an alternative new codes could be stored in the cache to accomplish new functionality not existing in the original codes already stored on the microprocessor (e.g., new instructions could be added in this manner). As yet another example, while FIG. 11 set forth below demonstrates one microprocessor system embodiment, various other processors could benefit as well. Still other alternatives will be ascertainable by a person skilled in the art, and all of the above demonstrates the flexibility of the inventive scope which is defined by the claims set forth at the end of this document.

3. Unique Identification at the Instruction Set Level

As mentioned above, the ability to provide patch codes benefits further when coupled with the ability to identify various details about the microprocessor within a system. Moreover, this identification process is preferably achieved electronically as opposed to some physical and/or external indication such as a bar code or printed label. For example, in the Intel x86 microprocessors, there is included an instruction at the instruction set architecture ("ISA") level known as CPUID. As known in the art, the CPUID instruction provides information to software including the vendor, family, model, and stepping of the microprocessor on which it is executing. This information may then be used by the software for purposes known in the art.

Other systems include certain electronic identification techniques. For example, some systems by IBM include a storage device separate from the microprocessor, where a system level identifier is stored in that separate storage device. This system, however, suffers various drawbacks. For instance, the identifier only identifies the system and not necessarily the specific microprocessor included within that system. In addition, because the identifier is in a storage device apart from the microprocessor, the identifier may fail its purpose if either the storage device or the microprocessor is replaced without updating the identifier in the storage device to reflect this changing event. As another example of current systems, some microprocessors include an identifier which is accessible via the JTAG scan. This approach, however, also suffers various drawbacks. For example, the JTAG scan is commonly a technique requiring access to a particular microprocessor port and with particularized equipment. In addition, the JTAG scan may only be performed meaningfully given knowledge about the scan chain of the scanned registers. Still further, this technique is commonly only used at the development and manufacturing stage.

Although either the CPUID instruction or the IBM system described above provides some information about the microprocessor which executes that instruction, the inventors of the present embodiments have discovered that such information by itself may be insufficient in certain instances. Indeed, the present inventors have further discovered that as microprocessor systems advance in development and complexity, it may be desirable to identify more information about a microprocessor than that provided by the CPUID instruction or by the IBM system. For example, the inventors of the present embodiments believe it highly beneficial to be able to uniquely and electronically identify each microprocessor, that is, in a manner where each microprocessor is uniquely distinguished from all other microprocessors. In contrast, the information output in response to the CPUID instruction does not accomplish this functionality. Thus, the following embodiments seek to provide such functionality, and include it at the ISA level.

FIG. 8 illustrates a flowchart of a method embodiment designated generally at 114 and which may be used with a microprocessor in accordance with the principles described below; note also that an example of such a microprocessor is described later in connection with FIG. 11. Before discussing the details of method 114 as well as the exemplary microprocessor of FIG. 11, note in general that the embodiments below operate to uniquely identify the microprocessor at the instruction set architecture ("ISA") level. Various benefits from these embodiments are set forth below, and still additional such benefits will be apparent to a person skilled in the art.

Method 114 begins with step 115, where a code is stored on the microprocessor chip and which uniquely identifies the microprocessor. For purposes of this document, this information is referred to as an identifier code. In the preferred embodiment, and as detailed below, this identifier code constitutes several groups of bits stored in a dedicated register included on the microprocessor chip. These groups of bits, when viewed together, form a pattern which is unique to the particular microprocessor which stores those bits. FIG. 9, discussed below, sets forth the preferred information of these bit groups. In the preferred embodiment, note that step 115 is performed at the stage where the microprocessor is manufactured. For example, and as detailed below, the identifier code is preferably stored to a one-time programmable register on the microprocessor. Once this event occurs, steps 116 through 122 may be performed by operating the microprocessor as discussed below.

Step 116 issues an instruction to the microprocessor at the ISA level and to cause the microprocessor to uniquely identify itself as described below. For purposes of this document, such an instruction, or a like instruction which accomplishes this functionality, is referred to as an identifier request instruction. In the preferred embodiment, the identifier request instruction is included within the instruction set of the microprocessor and, therefore, the instruction may be issued to the microprocessor by any feature having access to the ISA level of the microprocessor. For example, the identifier request instruction may be issued by a computer BIOS, an operating system, or an application program. In the preferred embodiment the identifier request instruction is a dedicated instruction which, as detailed below, operates as a request to read a register within the microprocessor; however, other instructions which perform the operations set forth below may be used in lieu of the preferred embodiment. For example, the CPUID instruction used in current 80x86 systems may be extended to achieve this functionality.

Step 118 decodes the identifier request instruction according to principles known in the art, and according to the particular decoding techniques applicable to the particular microprocessor which is processing the instruction. The description of FIG. 11, below, sets forth the decoding operation in accordance with the preferred embodiment.

Step 120 operates in response to the instruction issuance and decode step by accessing the identifier code stored on the microprocessor chip. This access step operates to allow reading of whatever resource is storing the identifier code. Thus, lastly in step 122, method 114 outputs the microprocessor identifier code. This information may be used internally for further processing by the microprocessor, or may be output externally for use by features such as those set forth above (i.e., BIOS, operating system, application program). Given this access, therefore, one skilled in the art will appreciate various benefits from having access to a unique identification of the microprocessor. For example, if a manufacturer learns of the same or similar operation problem within a group of different but uniquely identified microprocessors, the manufacturer may be better able to ascertain the commonality giving rise to the problem with those microprocessors. For instance, the manufacturer may determine that each of the problematic microprocessors were manufactured at the same facility and, therefore, that the particular facility should be reviewed to better understand the cause of the operation problem. As another example, it is unfortunately the case that microprocessor theft has vastly increased in recent years. Because the present inventive embodiments provide a unique identification for each microprocessor, microprocessors manufactured in accordance with the present embodiments may be traced and identified in the event of such a theft. As yet another example, unique identification of a microprocessor may permit a software seller to license software on a per microprocessor basis. Still other examples of benefits are either given below, or will be ascertainable by a person skilled in the art.

FIG. 9 illustrates the preferred identifier code 124 which is stored in a dedicated microprocessor register as described below, and which is output in step 122 as described above. As shown, identifier code 124 preferably includes 61 bits of information, which are separated into six separate groups designated 124a through 124f. Each of these bit groups is discussed below. Before discussing those groups, note that the register which stores identifier code 124 may exceed 61 bits and, in this instance, other information may be stored in that register to take advantage of the additional bit storage available in a dedicated register. For purposes of the present embodiments, however, only those bits shown in FIG. 9 are discussed.

Bit groups 124a through 124e are better understood by first reviewing various known principles as reflected in FIG. 10, and then returning to those groups. Particularly, FIG. 10 diagrammatically illustrates a lot 126 of semiconductor wafers. Note that FIG. 10 is simplified and not drawn to scale, but diagrammatically demonstrates the principles necessary to demonstrate various aspects of the present embodiments. Each wafer in FIG. 10 is designated separately by a capital "W" combined with a subscript designating that lot 126 includes N wafers. Further, each wafer W is of the type which is typical to construct microprocessors. Further, such wafers may be of various types, sizes, shapes and so forth, but commonly each is collected in a group known as a lot. Typically, a lot of wafers are assigned a lot number for tracking during the manufacturing process. Each wafer typically includes a reference point, such as a flat region which from the perspective of FIG. 10 is visible only on wafer $W_1$ and designated as $F_1$. Also as known in the art, each wafer lot such as lot 126 is processed at a fabrication facility in order to construct semiconductor chip devices. In the present embodiments, these chip devices are microprocessors which operate in accordance with the principles set forth in this document. Moreover, a plurality of microprocessors are formed on each such wafer, again according to whatever appropriate technique. For purposes of illustration, therefore, the perspective of FIG. 10 shows various boxes along wafer $W_1$, with each such box depicting diagrammatically a microprocessor manufactured on wafer $W_1$. For identification purposes, the location of each microprocessor on a given wafer is preferably assigned according to an X-Y coordinate system. As examples, therefore, note that certain microprocessors on wafer $W_1$ include a specific designation including a capital "M" and an "x,y" subscript. The "M" indicates that the die is a microprocessor while the "x,y" indicates the location of the microprocessor along the corresponding wafer. Note also that to simplify FIG. 10, only a few such designations are included. Moreover, due to the circular shape of each wafer and the orientation of the rows relative to the flat F1, certain rows along with wafer will include more columns than others. Typically, the numbering of rows and columns is relative to the row or rows containing the largest number of microprocessors along that row. For example, the second row shown in FIG. 10 includes seven microprocessors and the far left microprocessor is designated in column 0 of that row; however, for the first row immediately above it and due to the circular shape of that row, there is no microprocessor at the zero location of the row and, instead, the first numbered microprocessor in the first row is in column 1 rather than column 0. Of course, this numbering scheme is only by way of example, and others could be implemented by a person skilled in the art so that each microprocessor has a unique location coding along its corresponding semiconductor wafer.

Returning now to FIG. 9, and given the illustration of FIG. 10, groups 124a through 124e are better understood. Note that each of these groups in the preferred embodiment reflect information regarding the manufacturing location of the microprocessor. First, groups 124a and 124b specify the x and y coordinate, respectively, of the microprocessor on its corresponding wafer. For example, if the microprocessor located on the far left of the top row of FIG. 10 returned its identifier code 124, groups 124a and 124b would indicate, in whatever preferred manner, the x and y coordinates of 0 and 1, respectively. Second, group 124c identifies the number of the wafer within lot 126 on which the microprocessor was manufactured. Thus, in the instance of FIG. 10, group 124c would designate one of the wafers of the wafers indicated at $W_1$ through WN. Third, group 124d identifies the lot number of lot 126 assigned to the particular wafer which included the microprocessor at issue. Fourth, group 124e identifies the facility where the particular microprocessor was manufactured.

As demonstrated above, the preferred information within identifier code 124 designates, for a given microprocessor, a single location along a single wafer within a single wafer lot and at a single fabrication facility. Note that this information may be particularly beneficial for purposes of identifying operability problems with certain microprocessors. For example, if a group of microprocessors is identified having a common problem, statistical analyses may be performed on the above information to determine whether there is commonality of one of the above factors for those microprocessors have the same or similar operability problems. For instance, it may be determined that all, or most, of the problematic microprocessors came from a single lot of wafers. In another instance, it may be determined that all, or most, of the problematic microprocessors were located at a common x-y coordinate along various different wafers. Still other instances will be ascertainable by a person skilled in the art and, indeed, could be further enhanced if the particular type of information included within the identifier code were expanded by such a person. Thus, these additional advantages further demonstrate the inventive scope of the present embodiments.

From the above, note also that groups 124a through 124e may be combined to form a code which uniquely identifies the microprocessor. In other words, assuming correct encoding of those bits, those groups in combination should provide a series of bits which is unique for each microprocessor because only one microprocessor will be at a single location along a single wafer within a single wafer lot and at a single fabrication facility. In addition, each of those groups, as well as group 124f provides additional functionality as set forth above for each respective group. Note, however, that one skilled in the art could select less than all of those groups, or even alternative groups, and still achieve aspects of the inventive scope set forth herein. For example, the preferred embodiment described above involves manufacture of wafers in lots, which typically occurs using various mask sets for that lot. As an alternative, however, individual wafers may be constructed alone and not in lots, such as by using e-beam lithography. In this instance, alternative information could be written to each microprocessor to identify the particular instance of the lithographic formation of the microprocessor so that that instance, as well as the microprocessor itself, may be distinguished from other microprocessors and other instances of forming a microprocessor using the same or similar lithographic processes.

Completing the groups of FIG. 9, group 124f is an eighteen bit error correction code. Particularly, and as mentioned previously, in the preferred embodiment each bit of the identifier code is stored in a one-time programmable storage medium on the microprocessor. This medium is preferably a register which, during manufacture of the microprocessor, includes a number of fuses where the total number of fuses exceeds the number of bits necessary to uniquely identify the microprocessor. In order to encode the identifier code on the microprocessor, selected ones of the fuses are broken during the manufacturing stage. In the preferred embodiment, this selective breaking of fuses is achieved using a laser, as in the same manner as is known in the memory fabrication art. Indeed, note in the preferred embodiment described below in connection with FIG. 4 that the microprocessor preferably includes various cache structures. Some or all of these cache structures are preferably also constructed using the same fuse technique and, therefore, the additional cost of using that technique to encode the identifier code is substantially less than that compared to a microprocessor which is otherwise being constructed without that technique. Note further that in certain instances it may occur that one or more of the fuses, either before or after the initial fuse breaking operation, is erroneously configured; therefore, the erroneous fuses will not properly convey the intended information for the identifier code. As a result, the error correction code represented by group 124f permits selective changing of this bit group to indicate the erroneous configuration of the fuses and to provide the corrected information. Note that this feature is particularly beneficial because, without this aspect, the microprocessor would include only the minimal number of fuses to encode the identifier code; however, in such event, if it were learned that one of these limited number of fuses were erroneously configured, either the microprocessor would have to be discarded or it would not operate to output a correct identifier code.

In addition to the above, note that the one-time programmable storage medium on the microprocessor which stores the identifier code may be constructed by techniques other than fuses, and even if fuses are used, they may be created or broken by techniques other than laser breaking. As one example, fuses could be created but selectively broken with current. As another example, anti-fuses could be used to selectively form fuses to encode the preferred information. As another example, an EPROM could be used. As yet another example, if the e-beam lithography technology described above, or some like technology, were used to manufacture the microprocessor, then the beam could be written to directly encode the identifier onto the microprocessor. Still other techniques will be ascertainable to a person skilled in the art.

In another aspect of the present invention, each microprocessor having a unique identifier code stored in a register such as that set forth above will further include a dedicated register in addition to the fuse register, where that additional register however is of a more common read/write type register such as a static latch. Further, in this embodiment, the contents of the fuse register are copied at some point to the read/write type register, such as during reset of the microprocessor. Thereafter, the unique identifier code may be read from the read/write type register rather than the fuse register. Note that this additional aspect is beneficial for various reasons. For example, the fuse register is likely to require a consume a relatively larger amount of current; therefore, the copied information may instead be maintained and read (after the initial copy) in connection with the read/write type register, thereby reducing overall power consumption of the microprocessor and, more significantly, reducing standby power consumption as well.

From the above, it may be appreciated that the above embodiments provide circuits, systems, and methods for uniquely identifying a microprocessor at the instruction set level. Various benefits have been set forth above and others will be appreciated by a person skilled in the art. Still further, the while the present embodiments have been described in detail, various substitutions, modifications or alterations could be made to the descriptions set forth above without departing from the inventive scope. In addition to the many examples set forth above, in another example the various information encoded in the identifier code could be changed. As another example, the identifier code may be stored in a medium other than a one-time programmable register. Still further, in the instance where such a register is used, the identifier code could be encoded in such a register but using a configuration other than laser fuses. As yet another example, the identifier request instruction could include functionality in addition to that set forth above. The examples as well as others ascertainable by a person skilled in the art further demonstrate the flexibility and span of the inventive scope, as further demonstrated by the claims set forth at the end of this document.

4. Overall Microprocessor Architecture

Figure 11:
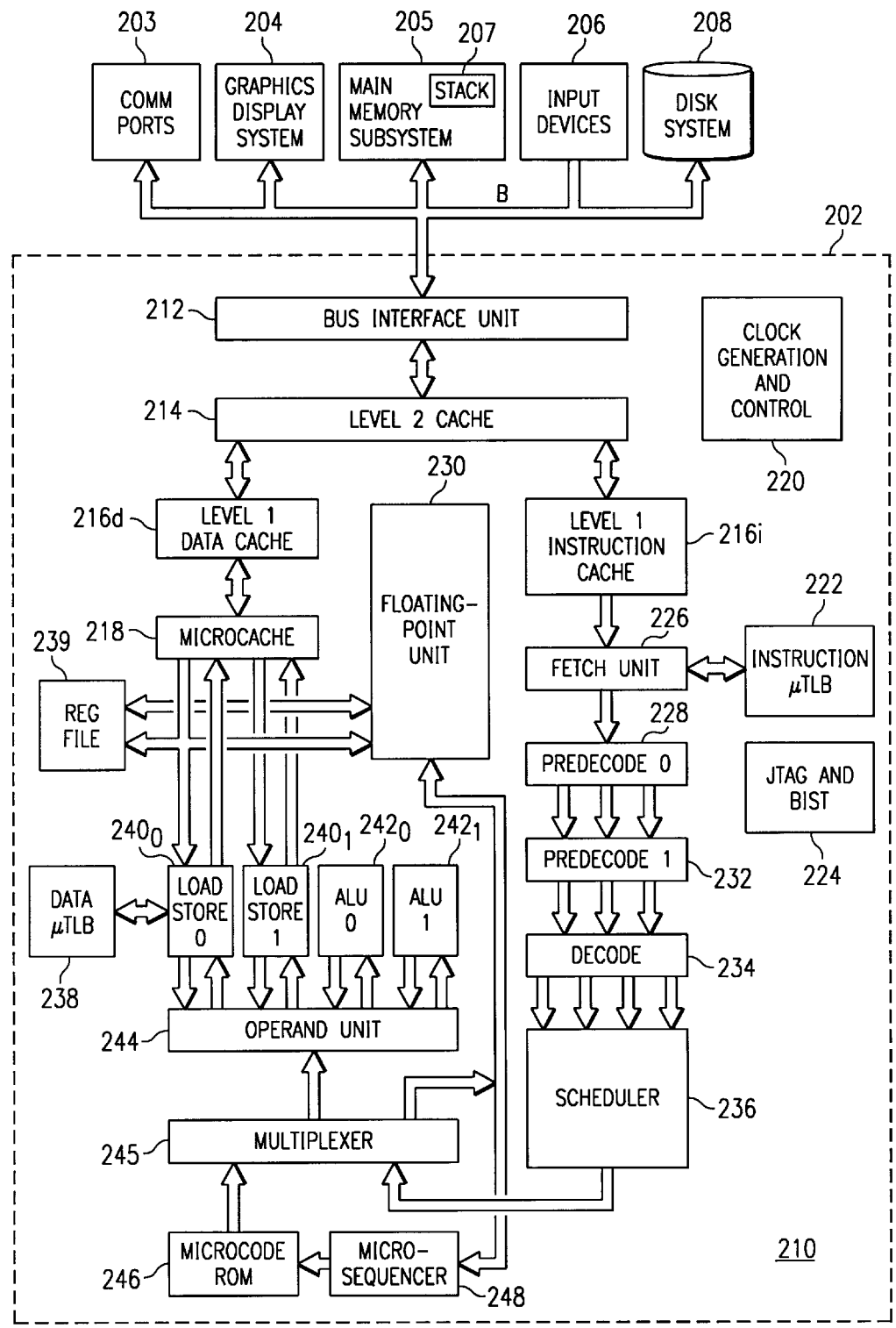
FIG. 11 illustrates an exemplary data processing system within which the preferred embodiments may be implemented.

Having described the above embodiments, FIG. 11 illustrates a block diagram of a microprocessor embodiment into which the above embodiments may be incorporated. Referring now to FIG. 11, an exemplary data processing system 202, including an exemplary superscalar pipelined microprocessor 210 within which the preferred embodiment is implemented, will be described. It is to be understood that the architecture of system 202 and of microprocessor 210 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 210, as shown in FIG. 11, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 202 contains such conventional subsystems as communication ports 203 (including modem ports and modems, network interfaces, and the like), graphics display system 204 (including video memory, video processors, a graphics monitor), main memory system 205 which is typically implemented by way of dynamic random access memory (DRAM) and includes a stack 207, input devices 206 (including keyboard, a pointing device, and the interface circuitry therefor), and disk system 208 (which may include hard disk drives, floppy disk drives, and CD-ROM drives). It is therefore contemplated that system 202 of FIG. 11 corresponds to a conventional desktop computer or workstation, as are now common in the art. Of course, other system implementations of microprocessor 210 can also benefit from the present embodiments, as will be recognized by those of ordinary skill in the art.

Microprocessor 210 includes a bus interface unit ("BIU") 212 that is connected to bus B, and which controls and effects communication between microprocessor 210 and the other elements in system 202. BIU 212 includes the appropriate control and clock circuitry to perform this function, including write buffers for increasing the speed of operation, and including timing circuitry so as to synchronize the results of internal microprocessor operation with bus B timing constraints. Microprocessor 210 also includes clock generation and control circuitry 220 which, in this exemplary microprocessor 210, generates internal clock phases based upon the bus clock from bus B; the frequency of the internal clock phases, in this example, may be selectably programmed as a multiple of the frequency of the bus clock.

As is evident in FIG. 11, microprocessor 210 has three levels of internal cache memory, with the highest of these as level 2 cache 214, which is connected to BIU 212. In this example, level 2 cache 214 is a unified cache, and is configured to receive all cacheable data and cacheable instructions from bus B via BIU 212, such that much of the bus traffic presented by microprocessor 210 is accomplished via level 2 cache 214, Of course, microprocessor 210 may also effect bus traffic around cache 214, by treating certain bus reads and writes as "not cacheable". Level 2 cache 214, as shown in FIG. 11, is connected to two level 1 caches 216; level 1 data cache $216d$ is dedicated to data, while level 1 instruction cache $216i$ is dedicated to instructions. Power consumption by microprocessor 210 is minimized by only accessing level 2 cache 214 only in the event of cache misses of the appropriate one of the level 1 caches 216. Furthermore, on the data side, microcache 218 is provided as a level 0 cache, which in this example is a fully dual-ported cache.

As shown in FIG. 11 and as noted hereinabove, microprocessor 210 is of the superscalar type. In this example multiple execution units are provided within microprocessor 210, allowing up to four instructions to be simultaneously executed in parallel for a single instruction pointer entry. These execution units include two ALUs $244_0$ and $244_2$ for processing conditional branch, integer, and logical operations, floating-point unit (FPU) 230, two load-store units $240_0$, $240_1$, and microsequencer 248. The two load-store units 240 utilize the two ports to microcache 218, for true parallel access thereto, and also perform load and store operations to registers in register file 239. Data micrtranslation lookaside buffer ($\mu$TLB) 238 is provided to translate logical data addresses into physical addresses, in the conventional manner.

These multiple execution units are controlled by way of multiple pipelines with seven stages each, with write back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register operands indicated by the AOps |
| EX | Execute: This stage runs the execution units according to the AOps and the retrieved operands |
| WB | Write back: This stage stores the results of the execution in registers or in memory |

Referring back to FIG. 11, the pipeline stages noted above are performed by various functional blocks within microprocessor 210. Fetch unit 226 generates instruction addresses from the instruction pointer, by way of instruction micro-translation lookaside buffer ($\mu$TLB) 222, which translates the logical instruction address to a physical address in the conventional way, for application to level 1 instruction cache $216_i$. Instruction cache $216_i$ produces a stream of instruction data to fetch unit 226, which in turn provides the instruction code to the predecode stages in the desired sequence. Speculative execution is primarily controlled by fetch unit 226, in a manner to be described in further detail hereinbelow.

Predecoding of the instructions is broken into two parts in microprocessor 210, namely predecode 0 stage 228 and predecode 1 stage 232. These two stages operate as separate pipeline stages, and together operate to locate up to three x86 instructions and apply the same to decoder 234. As such, the predecode stage of the pipeline in microprocessor 210 is three instructions wide. Predecode 0 unit 228, as noted above, determines the size and position of as many as three x86 instructions (which, of course, are variable length), and as such consists of three instruction recognizers; predecode 1 unit 232 recodes the multi-byte instructions into a fixed-length format, to facilitate decoding.

Decode unit 234, in this example, contains four instruction decoders, each capable of receiving a fixed length x86 instruction from predecode 1 unit 232 and producing from one to three atomic operations (AOps); AOps are substantially equivalent to RISC instructions. Three of the four decoders operate in parallel, placing up to nine AOps into the decode queue at the output of decode unit 234 to await scheduling; the fourth decoder is reserved for special cases. Scheduler 236 reads up to four AOps from the decode queue at the output of decode unit 234, and assigns these AOps to the appropriate execution units. In addition, the operand unit 244 receives and prepares the operands for execution, As indicated in FIG. 11, operand unit 244 receives an input from scheduler 236 and also from microcode ROM 246, via multiplexer 245, and fetches register operands for use in the execution of the instructions. In addition, according to this example, operand unit 244 performs operand forwarding to send results to registers that are ready to be stored, and also performs address generation for AOps of the load and store type.

Microsequencer 248, in combination with microcode ROM 246, control ALUs 242 and load/store units 240 in the execution of microcode entry AOps, which are generally the last AOps to execute in a cycle. In this example, microsequencer 248 sequences through microinstructions stored in microcode ROM 246 to effect this control for those microcoded microinstructions. Examples of microcoded microinstructions include, for microprocessor 210, complex or rarely-used x86 instructions, x86 instructions that modify segment or control registers, handling of exceptions and interrupts, and multi-cycle instructions (such as REP instructions, and instructions that PUSH and POP all registers).

Microprocessor 210 also includes circuitry 224 for controlling the operation of JTAG scan testing, and of certain built-in self-test functions, ensuring the validity of the operation of microprocessor 210 upon completion of manufacturing, and upon resets and other events.

Given the description of FIG. 11, as well as the descriptions above such as those relating to the prior Figures, one skilled in the art may appreciate that the various systems described above may be incorporated in connection with various components shown in FIG. 11. For example, microprocessor 210 could be used as microprocessor 24 from FIG. 1, in which case microprogram memory circuit 24b may be used within microcode ROM 246 and read/write memory space 24c may be used within level 2 cache 214. As yet another example, microprogram memory circuit 82 may be used within microcode ROM 246. As another example, cache circuit 84 (FIGS. 4 through 7) is preferably included within level 2 cache 214, as this cache is sufficiently large and the impact on the remaining circuits having access to the cache are minimized. As still another example, microprocessor 210 could be used as any microprocessor shown within FIG. 10. Various related functionality of each of the above features and embodiments also may be further performed by the appropriate circuitry within FIG. 11, as will be appreciated by a person skilled in the art.

What is claimed is:

1. A method of operating a computer system having a type of configuration and comprising a single integrated circuit microprocessor, wherein the single integrated circuit microprocessor includes a read only original code memory not directly accessible externally to the single integrated circuit microprocessor and a patch memory table, operates in response to original codes recalled from corresponding addresses in the read only original code memory and comprises an instruction set, the method comprising the steps of:

determining the type of the configuration;

in response to the type of the configuration, selecting a set of patch codes from a plurality of sets of patch codes;

issuing a patch request instruction from the instruction set to the single integrated circuit microprocessor;

in response to issuing the patch request instruction
      storing the selected set of patch codes to a memory space accessible by the microprocessor,
      storing in the patch table memory an indication of each address in the read only original code memory storing a corresponding original code to be replaced by one of the selected set of patch codes;

detecting a request within the single integrated circuit microprocessor for an original code from the read only original code memory;

determining from the indication of each address stored in the patch table memory whether a requested original code is to be replaced by a patch code;

operating in response to the requested original code upon determination that the requested original code is not to be replaced by a patch code; and substituting a corresponding patch code from the memory space for the requested original code and operating in response to the substituted patch code upon determination that the requested original code is to be replaced by a patch code.

2. The method of claim 1 and further comprising the step of setting a lock indicator, wherein the locked indicator in a locked stated represents that the selected set of patch codes are stored to the memory space.

3. The method of claim 2 wherein the patch request instruction comprises a first patch request instruction, and further comprising the steps of:

evaluating the lock indicator; and optionally issuing a second patch request instruction from the instruction set.

4. The method of claim 3 and further comprising the steps of:

determining the type of the configuration a second time;

in response to the type of the configuration the second time, selecting a second set of patch codes from the plurality of sets of patch codes; and storing the selected second set of patch codes to the memory space responsive to determining that the lock indicator indicates an unlocked state.

5. The method of claim 2 and further comprising the step of issuing a set lock instruction from the instruction set, wherein said step of setting a lock indicator occurs in response to the set lock instruction.

6. The method of claim 2 wherein said set step of setting a lock indicator occurs in response to the patch request instruction.

7. The method of claim 1 wherein each of said steps of determining, issuing, selecting, storing the set of patch codes and storing the indication operate in response to a patch program, and further comprising, prior to said steps of determining, issuing, selecting, storing the set of patch codes and storing the indication, the step of storing the patch program to the computer system.

8. The method of claim 7 wherein said step of storing the patch program to the computer system comprises storing the patch program to a nonvolatile storage medium of the computer system.

9. The method of claim 7 wherein said step of storing the patch program to the computer system comprises storing the patch program to the computer system via a telecommunications link.

10. The method of claim 7 wherein said step of storing the patch program to the computer system comprises storing the patch program to the computer system via a computer network.

11. The method of claim 1 and further comprising, prior to said steps of determining, issuing, selecting, storing the set of patch codes and storing the indication, the step of storing the plurality of sets of patch codes to the computer system.

12. The method of claim 11 wherein said step of storing the plurality of sets of patch codes to the computer system comprises storing the plurality of sets of patch codes to a nonvolatile storage medium of the computer system.

13. The method of claim 11 wherein said step of storing the plurality of sets of patch codes to the computer system comprises storing the plurality of sets of patch codes to the computer system via a telecommunications link.

14. The method of claim 1 and further comprising the steps of:
   first, evaluating a key within the single integrated circuit microprocessor; and
   second, in response to determining that the key satisfies at least a first criterion, the steps of:
   performing said storing step; and
   changing the key to a second key.

15. The method of claim 14 wherein the patch request instruction comprises a first patch request instruction and wherein the selected set comprises a first selected set, and further comprising the steps of:
   selecting a second set of patch codes from a plurality of sets of patch codes;
   issuing a second patch request instruction from the instruction set; and
   storing the selected second set of patch codes to the memory space in response to the second key satisfying at least a second criterion.

16. The method of claim 1 wherein the type of configuration comprises a revision indicator, and further comprising the step of modifying the revision indicator to form a modified revision indicator in response to the patch request instruction.

17. The method of claim 16 wherein the patch request instruction comprises a first patch request instruction, wherein the selected set comprises a first selected set, and wherein the type of configuration comprises the modified revision indicator, and further comprising the steps of:
   selecting a second set of patch codes from a plurality of sets of patch codes in response to the type of configuration;
   issuing a second patch request instruction from the instruction set; and
   storing the selected second set of patch codes to the memory space.

18. The method of claim 1 wherein the single integrated circuit microprocessor further includes a cache memory disposed to cache a first kind of information stored in said computer-readable memory and said step of storing the selected set of patch codes to a memory space comprises storing the selected set of patch codes to the cache memory, wherein the cache memory is coupled to store a second kind of information comprising the selected set of patch codes differing from the first kind of information, the second kind of information being marked to prevent it from being accessed as the first kind of information.

19. The method of claim 18 wherein:
   said step of storing in the patch table memory an indication of each address in the read only code memory storing a corresponding original code to be replaced by one of the selected set of patch codes further comprises storing in the patch table memory an address within the cache memory where the selected one of the set of patch codes is stored; and
   said step of substituting a corresponding patch code from the memory space for the requested original code comprises recalling the corresponding patch code from address within the cache memory of the corresponding indication within the patch table memory.

20. The method of claim 1 and further comprising the steps of:
   evaluating a key within the single integrated circuit microprocessor; and
   prohibiting said step of storing the selected set of patch codes to the memory space if the key does not satisfy at least a first criterion.

21. The method of claim 1 and further comprising the steps of:
   responsive to said step of operating in response to the substituted patch code, outputting a signal external from the microprocessor representing operation in response to the patch code.

22. The method of claim 1 wherein the memory space storing the selected set of patch codes is located on the integrated circuit comprising the microprocessor.

23. The method of claim 1 wherein each of said steps of determining, issuing, selecting, storing the set of patch codes and storing the indication operate in response to a patch program, and wherein said step of selecting a set of patch codes from a plurality of sets of patch codes comprises selecting a set of patch codes from the patch program.

24. The method of claim 1 wherein each of said steps of determining, issuing, selecting, storing the set of patch codes and storing the indication operate in response to a patch program, and wherein said step of selecting a set of patch codes from a plurality of sets of patch codes comprises selecting a set of patch codes from a resource other than the patch program.

25. The method of claim 1 wherein each of said steps of determining, issuing, selecting, storing the set of patch codes and storing the indication operate in response to initialization of the computer system.

26. The method of claim 1 wherein said step of determining the type of configuration comprises determining the unique identification of the single integrated circuit microprocessor.

27. The method of claim 1 wherein:
   the patch table memory comprises a random access read/write memory and includes a plurality of data entries, each data entry corresponding to each original code stored in the read only original code memory; and
   said step of storing in the patch table memory an indication of each address in the read only code memory storing a corresponding original code to be replaced by one of the selected set of patch codes comprises setting a patch table memory data entry corresponding to the original code to be replaced to a first state.

28. The method of claim 1 wherein:
   the patch table memory comprises a content addressable memory and includes a plurality of data entries, each data entry including a read only original code memory address; and
   said step of storing in the patch table memory an indication of each address in the read only code memory storing a corresponding original code to be replaced by one of the selected set of patch codes comprises storing in the patch table memory a read only original code memory address corresponding to the original code to be replaced to a first state.

29. The method of claim 1 wherein:
   said step of storing in the patch table memory an indication of each address in the read only code memory storing a corresponding original code to be replaced by one of the selected set of patch codes further comprises storing in the patch table memory an address within the memory space where the selected one of the set of patch codes is stored; and
   said step of substituting a corresponding patch code from the memory space for the requested original code comprises recalling the corresponding patch code from address within the memory space of the corresponding indication within the patch table memory.

30. The method of claim 1 wherein:
each of said steps of determining, selecting, issuing, storing the set of patch codes and storing the indication operate in response to a patch program;
prior to said steps of determining, selecting, issuing, storing the set of patch codes and storing the indication, the step of storing the patch program to the computer system in a read only basic input/output system memory; and
said step of operating in response to the patch program occurs once each initialization of the computer system.

31. The method of claim 1 wherein:
each of said steps of determining, selecting, issuing, storing the set of patch codes and storing the indication operate in response to a patch program;
prior to said steps of determining, selecting, issuing, storing the set of patch codes and storing the indication, the step of storing the patch program to the computer system in a memory accessible by an operating system program; and
said step of operating in response to the patch program occurs once each initialization of the operating system program.

32. The method of claim 1 wherein:
each of said steps of determining, selecting, issuing, storing the set of patch codes and storing the indication operate in response to a patch program;
prior to said steps of determining, selecting, issuing, storing the set of patch codes and storing the indication, the step of storing the patch program to the computer system in a memory accessible by an application program; and
said step of operating in response to the patch program occurs once operation of the application program.

33. A method of operating a computer system having a type of configuration and comprising a single integrated circuit microprocessor, wherein the single integrated circuit microprocessor includes a read only original code memory not directly accessible externally to the single integrated circuit microprocessor and a patch memory table, operates in response to original codes stored in corresponding addresses in the read only original code memory and comprises an instruction set, the method comprising the steps of:
determining the type of the configuration;
in response to the type of the configuration, selecting a set of patch codes from a plurality of sets of patch codes;
evaluating a key within the single integrated circuit microprocessor; and
issuing a patch request instruction from the instruction set to the single integrated circuit microprocessor;
in response to issuing the patch request instruction
storing the selected set of patch codes to a memory space accessible by the microprocessor in response to the key satisfying at least a first criterion;
storing in the patch table memory an indication of each address in the read only original code memory storing a corresponding original code to be replaced by one of the selected set of patch codes in response to the key satisfying at least a first criterion;
setting a lock indicator, wherein the locked indicator in a locked stated represents that the selected set of patch codes are stored to the memory space;
detecting a request within the single integrated circuit microprocessor for an original code from the read only original code memory;
determining from the indication of each address stored in the patch table memory whether a requested original code is to be replaced by a patch code;
operating in response to the requested original code upon determination that the requested original code is not to be replaced by a patch code; and
substituting a corresponding patch code from the memory space for the requested original code and operating in response to the substituted patch code upon determination that the requested original code is to be replaced by a patch code.

34. The method of claim 33 wherein the patch request instruction comprises a first patch request instruction, and further comprising the steps of:
evaluating the lock indicator;
determining the type of the configuration a second time;
in response to the type of the configuration the second time, selecting a second set of patch codes from the plurality of sets of patch codes;
issuing a second patch request instruction from the instruction set; and
storing the selected second set of patch codes to the memory space responsive to determining that the lock indicator indicates an unlocked state.

35. The method of claim 33 and further comprising the step of, in response to determining that the key satisfies at least a first criterion, the step of changing the key to a second key.

36. The method of claim 35 wherein:
the patch table memory comprises a random access read/write memory and includes a plurality of data entries, each data entry corresponding to each original code stored in the read only original code memory; and
said step of storing in the patch table memory an indication of each address in the read only code memory storing a corresponding original code to be replaced by one of the selected set of patch codes comprises setting a patch table memory data entry corresponding to the original code to be replaced to a first state.

37. The method of claim 35 wherein:
the patch table memory comprises a content addressable memory and includes a plurality of data entries, each data entry including a read only original code memory address; and
said step of storing in the patch table memory an indication of each address in the read only code memory storing a corresponding original code to be replaced by one of the selected set of patch codes comprises storing in the patch table memory a read only original code memory address corresponding to the original code to be replaced to a first state.

38. The method of claim 35 wherein:
said step of storing in the patch table memory an indication of each address in the read only code memory storing a corresponding original code to be replaced by one of the selected set of patch codes further comprises storing in the patch table memory an address within the memory space where the selected one of the set of patch codes is stored; and
said step of substituting a corresponding patch code from the memory space for the requested original code comprises recalling the corresponding patch code from address within the memory space of the corresponding indication within the patch table memory.

39. A computer system having a type of configuration and comprising:

an input device;

an output device;

a single integrated circuit microprocessor, said single integrated circuit microprocessor including a read only original code memory not directly accessible externally to the single integrated circuit microprocessor and a patch code table memory, wherein the microprocessor operates in response to original codes recalled from corresponding addresses in said read only original code memory and comprises an instruction set;

a memory space accessible by said single integrated circuit microprocessor;

a computer-readable memory configured so that, when read and used by the computer system, the computer system is directed by a plurality of operations comprising:

determining the type of the configuration;

in response to the type of the configuration, selecting a set of patch codes from a plurality of sets of patch codes;

issuing a patch request instruction from the instruction set; and in response to issuing a patch request instruction storing the selected set of patch codes to a memory space, storing in the patch table memory an indication of each address in the read only original code memory storing a corresponding original code to be replaced by one of the selected set of patch codes;

said single integrated circuit microprocessor further including means for generating a code address of a next original code, said code address supplied to said read only original code memory for recall of said next original code and to said patch table memory; and said single integrated circuit microprocessor further including a multiplexer having a first input receiving original codes recalled from said read only original code memory, a second input receiving patch codes recalled from said memory space accessible by said single integrated circuit microprocessor, a control input connected to said patch code table receiving said indication of whether said corresponding original code is to be replaced by one of the selected set of patch codes and an output coupled to said first input if said indication stored in said patch code table memory indicates that the requested original code is not to be replaced by a patch code and coupled to said second input if said indication stored in said patch code table indicates that the requested original code is to be replaced by a patch code.

40. The computer system of claim 39 and wherein the plurality of operations further comprises setting a lock indicator, wherein the locked indicator in a locked stated represents that the selected set of patch codes are stored to the memory space.

41. The computer system of claim 40 wherein the patch request instruction comprises a first patch request instruction, and wherein the plurality of operations further comprises:

evaluating the lock indicator; and issuing a second patch request instruction from the instruction set.

42. The computer system of claim 41 and wherein the plurality of operations further comprises:

determining the type of the configuration a second time;

in response to the type of the configuration the second time, selecting a second set of patch codes from the plurality of sets of patch codes; and storing the selected second set of patch codes to the memory space responsive to determining that the lock indicator indicates an unlocked state.

43. The computer system of claim 40 and wherein the plurality of operations further comprises the step of issuing a set lock instruction from the instruction set, wherein said step of setting a lock indicator occurs in response to the set lock instruction.

44. The computer system of claim 40 wherein said set step of setting a lock indicator occurs in response to the patch request instruction.

45. The computer system of claim 39 wherein the plurality of operations further comprises:

first, evaluating a key within the single integrated circuit microprocessor; and second, in response to determining that the key satisfies at least a first criterion, the steps of:

performing said storing step; and changing the key to a second key.

46. The computer system of claim 45 wherein the patch request instruction comprises a first patch request instruction and wherein the selected set comprises a first selected set, and wherein the plurality of operations further comprises:

selecting a second set of patch codes from a plurality of sets of patch codes;

issuing a second patch request instruction from the instruction set; and storing the selected second set of patch codes to the memory space in response to the second key satisfying at least a second criterion.

47. The computer system of claim 39 wherein the type of configuration comprises a revision indicator, and wherein the plurality of operations further comprises the step of modifying the revision indicator to form a modified revision indicator in response to the patch request instruction.

48. The computer system of claim 47 wherein the patch request instruction comprises a first patch request instruction, wherein the selected set comprises a first selected set, and wherein the type of configuration comprises the modified revision indicator, and wherein the plurality of operations further comprises:

selecting a second set of patch codes from a plurality of sets of patch codes in response to the type of configuration;

issuing a second patch request instruction from the instruction set; and storing the selected second set of patch codes to the memory space.

49. The computer system of claim 39 wherein each of said steps of determining, issuing, selecting, storing the set of patch codes and storing the indication operate in response to a patch program, and wherein the computer system comprises a storage medium storing the patch program.

50. The computer system of claim 49 wherein said storage medium comprises nonvolatile storage.

51. The computer system of claim 39 and further comprising a storage medium storing the plurality of sets of patch codes to the computer system.

52. The computer system of claim 51 wherein said storage medium comprises nonvolatile storage.

53. The computer system of claim 39 wherein:

said single integrated circuit microprocessor further includes a cache memory disposed to cache a first kind of information stored in said computer-readable memory; and within said plurality of operations, said step of storing the selected set of patch codes to a memory space comprises storing the selected set of patch codes to a cache memory, wherein the cache memory is coupled to store a second kind of information comprising the selected set of patch codes differing from the first kind of information, the second kind of information being marked to prevent it from being accessed as the first kind of information.

54. The computer system of claim 53 wherein:

within said plurality of operations, said step of storing in the patch table memory an indication of each address in the read only code memory storing a corresponding original code to be replaced by one of the selected set of patch codes further comprises storing in the patch table memory an address within the cache memory where the selected one of the set of patch codes is stored; and within said plurality of operations, said step of substituting a corresponding patch code from the memory space for the requested original code comprises recalling the corresponding patch code from address within the cache memory of the corresponding indication within the patch table memory.

55. The computer system of claim 39 wherein the plurality of operations further comprises:

evaluating a key within the single integrated circuit microprocessor; and prohibiting said step of storing the selected set of patch codes to the memory space if the key does not satisfy at least a first criterion.

56. The computer system of claim 39 and wherein the microprocessor is operable to perform the following operations:

responsive to said multiplexer selecting said second input, outputting a signal external from the microprocessor representing operation in response to the patch code.

57. The computer system of claim 39 wherein the said memory space accessible by the single integrated circuit storing said patch codes is disposed within said single integrated circuit microprocessor.

58. The computer system of claim 39 wherein each of said steps of determining, issuing, selecting, storing the set of patch codes and storing the indication operate in response to a patch program, and wherein said step of selecting a set of patch codes from a plurality of sets of patch codes comprises selecting a set of patch codes from the patch program.

59. The computer system of claim 39 wherein each of said steps of determining, issuing, selecting, storing the set of patch codes and storing the indication operate in response to a patch program, and wherein said step of selecting a set of patch codes from a plurality of sets of patch codes comprises selecting a set of patch codes from a resource other than the patch program.

60. The computer system of claim 39 wherein each of said steps of determining, issuing, selecting, storing the set of patch codes and storing the indication operate in response to initialization of the computer system.

61. The computer system of claim 39 wherein said step of determining the type of configuration comprises determining the unique identification of the single integrated circuit microprocessor.

62. The computer system of claim 39 wherein:

said patch table memory comprises a random access read/write memory and includes a plurality of data entries, each data entry corresponding to each original code stored in the read only original code memory; and within said plurality of operations, said step of storing in the patch table memory an indication of each address in the read only code memory storing a corresponding original code to be replaced by one of the selected set of patch codes comprises setting a patch table memory data entry corresponding to the original code to be replaced to a first state.

63. The computer system of claim 39 wherein:

the patch table memory comprises a content addressable memory and includes a plurality of data entries, each data entry including a read only original code memory address; and within said plurality of operations, said step of storing in the patch table memory an indication of each address in the read only code memory storing a corresponding original code to be replaced by one of the selected set of patch codes comprises storing in the patch table memory a read only original code memory address corresponding to the original code to be replaced to a first state.

64. The computer system of claim 39 wherein:

said step of storing in the patch table memory an indication of each address in the read only code memory storing a corresponding original code to be replaced by one of the selected set of patch codes further comprises storing in the patch table memory an address within the memory space where the selected one of the set of patch codes is stored; and within said plurality of operations, said step of substituting a corresponding patch code from the memory space for the requested original code comprises recalling the corresponding patch code from address within the memory space of the corresponding indication within the patch table memory.

65. The computer system of claim 39 further comprising:

a read only basic input/output system memory storing computer system initialization instructions;

within said plurality of operations, each of said steps of determining, selecting, issuing, storing the set of patch codes and storing the indication operate in response to a patch program;

said plurality of operations prior to said steps of determining, selecting, issuing, storing the set of patch codes and storing the indication, further includes the step of storing the patch program to the computer system in a read only basic input/output system memory; and within said plurality of operations, said step of operating in response to the patch program occurs once each initialization of the computer system.

66. The computer system of claim 39 further comprising:

a nonvolatile memory storing an operating system program;

within said plurality of operations, each of said steps of determining, selecting, issuing, storing the set of patch codes and storing the indication operate in response to a patch program;

said plurality of operations prior to said steps of determining, selecting, issuing, storing the set of patch codes and storing the indication, the step of storing the patch program to the computer system in a memory accessible by an operating system program; and within said plurality of operations, said step of operating in response to the patch program occurs once each initialization of the operating system program.

67. The computer system of claim 39 further comprising:

a nonvolatile memory storing an application program;

within said plurality of operations, each of said steps of determining, selecting, issuing, storing the set of patch codes and storing the indication operate in response to a patch program;

said plurality of operations prior to said steps of determining, selecting, issuing, storing the set of patch codes and storing the indication, the step of storing the patch program to the computer system in a memory accessible by an application program; and within said plurality of operations, said step of operating in response to the patch program occurs once operation of the application program.

\* \* \* \* \*